(12) United States Patent
Lanka et al.

(10) Patent No.: US 12,117,960 B2
(45) Date of Patent: Oct. 15, 2024

(54) APPROXIMATE DATA BUS INVERSION TECHNIQUE FOR LATENCY SENSITIVE APPLICATIONS

(71) Applicant: Intel Corporation, Santa Clara, CA (US)

(72) Inventors: Narasimha Lanka, Dublin, CA (US); Lakshmipriya Seshan, Sunnyvale, CA (US); Gerald S. Pasdast, San Jose, CA (US); Zuoguo Wu, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 843 days.

(21) Appl. No.: 17/029,288

(22) Filed: Sep. 23, 2020

(65) Prior Publication Data

US 2021/0004347 A1    Jan. 7, 2021

(51) Int. Cl.
*G06F 13/42* (2006.01)
*G06F 13/40* (2006.01)

(52) U.S. Cl.
CPC ...... *G06F 13/4291* (2013.01); *G06F 13/4068* (2013.01); *G06F 13/423* (2013.01)

(58) Field of Classification Search
CPC ............. G06F 13/4291; G06F 13/4068; G06F 13/423; G06F 13/4022; G06F 2213/0024; G06F 2213/0026
See application file for complete search history.

(56) References Cited

U.S. PATENT DOCUMENTS

| | | | | |
|---|---|---|---|---|
| 5,917,364 A | * | 6/1999 | Nakamura | ......... H03K 19/0008 327/415 |
| 7,102,544 B1 | * | 9/2006 | Liu | ...................... G06F 11/1032 711/119 |
| 7,501,963 B1 | * | 3/2009 | Hollis | ..................... H03M 7/14 341/55 |

(Continued)

OTHER PUBLICATIONS

Singh, Tejinder, et al.; "Redundancy Based Design and Analysis of ALU Circuit Using CMOS 180nm Process Technology for Fault Tolerant Computing Architectures," International Journal of Computing and Digital Systems, No. 1; retrieved from the internet at https://www.researchgate.net/publication/271207628_Redundancy_Based_Design_and_Analysis_of_ALU_Circuit_Using_CMOS_180nm_Process_Technology_for_Fault_Tolerant_Computing_Architectures/download; Jan. 1, 2015; 11 pages.

(Continued)

*Primary Examiner* — Faisal M Zaman
(74) *Attorney, Agent, or Firm* — Alliance IP, LLC

(57) ABSTRACT

Systems, methods, and apparatuses associated with an approximate majority based data bus inversion technique are disclosed. A method comprises obtaining, at a first device connected by a plurality of lanes to a second device, original data comprising first bits and second bits, where the first bits are to be transmitted in a new clock cycle via first lanes of the plurality of lanes, and the second bits are to be transmitted in the new clock cycle via second lanes of the plurality of lanes. The method further includes determining whether a first criterion associated with the first bits is met, (Continued)

determining whether a second criterion associated with the second bits is met, and transmitting an inverted version of the original data via the plurality of lanes based, at least in part, on determining that the first criterion and the second criterion are met.

20 Claims, 19 Drawing Sheets

(56) References Cited

U.S. PATENT DOCUMENTS

| | | | | |
|---|---|---|---|---|
| 8,963,575 | B2* | 2/2015 | Youssefi | H03K 19/23 |
| | | | | 326/36 |
| 9,373,395 | B1* | 6/2016 | Augustine | G11C 11/1673 |
| 2004/0068594 | A1* | 4/2004 | Asaro | G06F 13/4217 |
| | | | | 710/104 |
| 2006/0259716 | A1* | 11/2006 | Moschopoulos | G11C 16/10 |
| | | | | 711/156 |
| 2009/0182918 | A1* | 7/2009 | Hollis | G11C 7/1006 |
| | | | | 710/106 |
| 2009/0306936 | A1* | 12/2009 | Kawabata | G01R 13/0272 |
| | | | | 702/189 |
| 2011/0025533 | A1* | 2/2011 | Abbasfar | H04L 25/14 |
| | | | | 341/63 |
| 2011/0191648 | A1* | 8/2011 | Suzuki | H03M 13/05 |
| | | | | 714/752 |
| 2012/0166904 | A1* | 6/2012 | Bandholz | G06F 11/1048 |
| | | | | 714/746 |
| 2012/0206280 | A1* | 8/2012 | Abbasfar | G06F 13/4204 |
| | | | | 341/51 |
| 2012/0229310 | A1* | 9/2012 | Chang | G06F 13/4072 |
| | | | | 341/55 |
| 2013/0061006 | A1* | 3/2013 | Hein | G11C 5/148 |
| | | | | 711/E12.001 |
| 2013/0111102 | A1* | 5/2013 | Kim | G11C 7/1006 |
| | | | | 711/E12.001 |
| 2014/0143586 | A1* | 5/2014 | Dalumi | G06F 1/14 |
| | | | | 713/600 |
| 2015/0178237 | A1* | 6/2015 | Kesling | H04L 1/20 |
| | | | | 375/296 |
| 2018/0047432 | A1* | 2/2018 | Kondo | G11C 5/025 |
| 2018/0101502 | A1 | 4/2018 | Nassif et al. | |
| 2018/0351574 | A1* | 12/2018 | Ware | G06F 3/0653 |
| 2019/0280813 | A1 | 9/2019 | Kozhikkottu et al. | |
| 2020/0251159 | A1* | 8/2020 | Lanka | G11C 5/06 |
| 2021/0288848 | A1* | 9/2021 | Bohlin | H04L 25/4915 |

OTHER PUBLICATIONS

Wikipedia, "Inversion Encoding," accessed on the internet at https://en.wikipedia.org/wiki/Inversion_encoding; article as edited on Oct. 24, 2019; 3 pages.

Wikipedia, "Majority function," accessed on the internet at https://en.wikipedia.org/wiki/Majority_function, article as edited on May 9, 2020; 4 pages.

* cited by examiner

| TOTAL LANES | BIT LENGTH FOR SIMULATIONS | | 10^12-1 | | | | | |
|---|---|---|---|---|---|---|---|---|
| | NUMBER OF GROUPS | LANES PER GROUP | NO DBI | | TRADITIONAL DBI | | MAJORITY VOTE BASED DBI | |
| | | | MEAN | STD DEV | MEAN | STD DEV | MEAN | STD DEV |
| 16 | 4 | 4 | 8 | 2.0004 | 6.8225 | 1.1986 | 7.1214 | 1.5331 |
| | 2 | 8 | | | | | 7.0064 | 1.4819 |
| 12 | 4 | 3 | 6 | 1.7324 | 5.0337 | 1.049 | 5.7067 | 1.6191 |
| | 3 | 4 | | | | | 5.3761 | 1.4098 |
| | 2 | 6 | | | | | 5.244 | 1.2939 |
| 8 | 4 | 2 | 4 | 1.4145 | 3.2696 | 0.85807 | 3.5441 | 1.1561 |
| | 2 | 4 | | | | | 3.4628 | 1.08374 |

FIG. 17

APPROXIMATE DATA BUS INVERSION TECHNIQUE FOR LATENCY SENSITIVE APPLICATIONS

TECHNICAL FIELD

Various embodiments generally may relate to the technical field of computing, and in particular, to an approximate data bus inversion technique for latency sensitive applications.

BACKGROUND

Data bus inversion (DBI) is an encoding algorithm that may be used to reduce signaling power when data is transmitted within a computing system. A DBI algorithm can be applied to invert (or not invert) the bits of data to be transmitted within the computing system based on a predetermined criteria defined in the algorithm. Performing DBI for a large number of bits on wide parallel interfaces, however, may increase latency.

BRIEF DESCRIPTION OF THE FIGURES

FIG. 17 is a spreadsheet of switching statistics of various scenarios using different parameters in various systems.

Like reference numerals and designations in the various drawings indicate like elements. Embodiments are illustrated by way of example and not by way of limitation in the FIGURES of the accompanying drawings.

DETAILED DESCRIPTION

Figure 1:
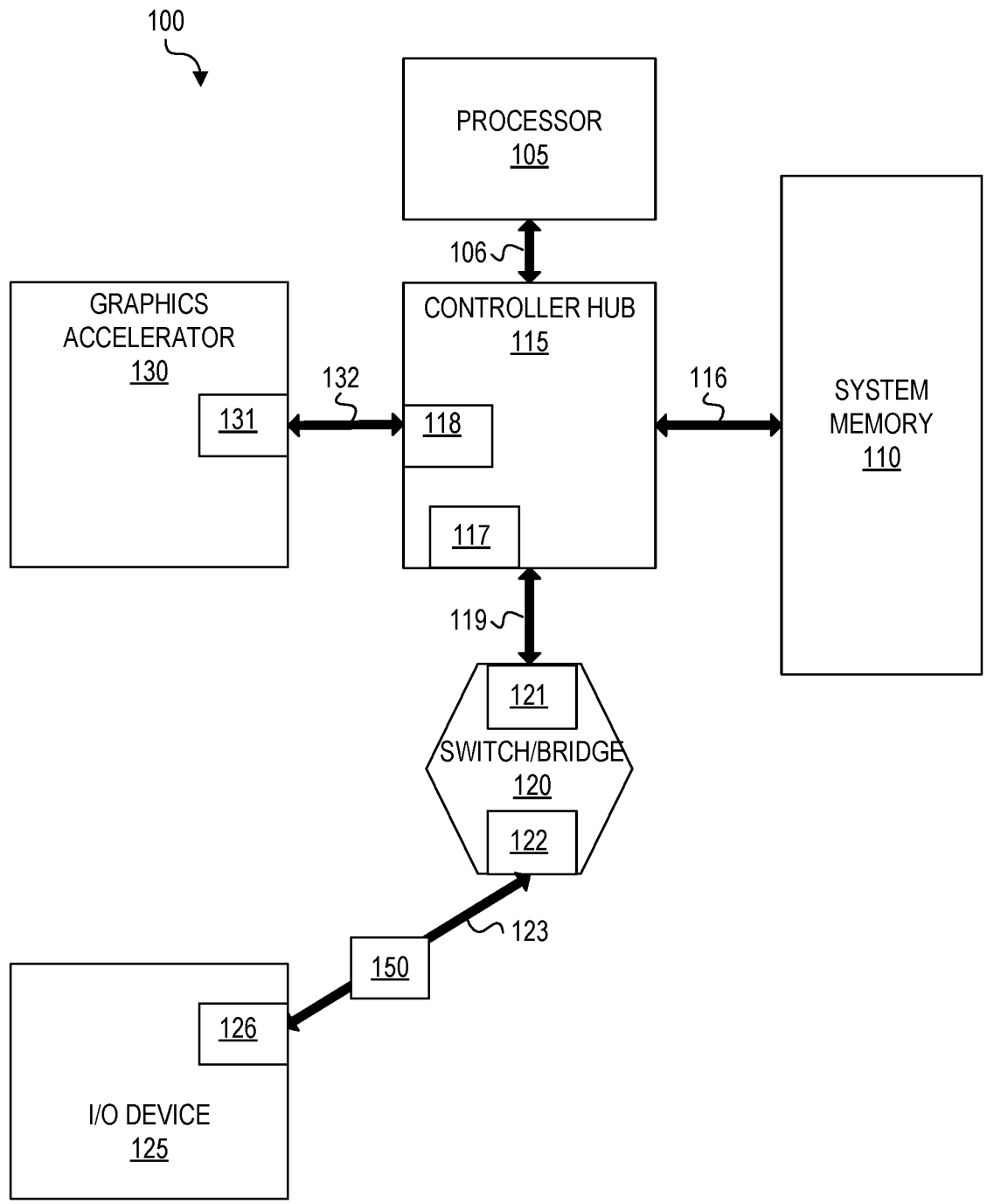
FIG. 1 illustrates an embodiment of a computing system including an interconnect architecture.

The present disclosure provides various possible embodiments, or examples, of systems, methods, apparatuses, and architectures for implementing an approximate majority vote based data bus inversion technique. In one or more embodiments, an approximate majority vote algorithm is used in conjunction with a data bus inversion (DBI) algorithm to significantly reduce latency and to limit simultaneous switching output (SSO) noise in data transmissions within a computing system. For a given number of DBI lanes (e.g., individual bits transmitted across a single wire), initially, a determination is made as to whether the bit value of each data lane from an previous clock cycle is to be switched or transitioned to a new bit value (e.g., 1 to 0 or 0 to 1) in order to transmit the original (i.e., noninverted) data. Majority vote logic can be used to approximate whether a majority of bit values of the data lanes are required to switch or transition to a new value. In this embodiment, a decision can be made to either assert or de-assert DBI based on the result of applying the majority vote logic to two or more sets of inputs that indicate whether transitions are required for bit values of the data lanes associated with a previous clock cycle based the bit values of associated bits to be transmitted over the data lanes in a new clock cycle. In other embodiments, the majority vote logic can be used to approximate whether a majority of bits to be transmitted in a new clock cycle require a certain logic level (e.g., 1 or 0) to be transmitted via the data lanes at the same time. In this embodiment, a decision can be made to either assert or de-assert DBI based on the result of applying the majority vote logic to two or more sets of the bit values of the bits to be transmitted over the data lanes.

In the following description, for purposes of explanation and not limitation, numerous specific details are set forth such as specific types of processors and system configurations, specific hardware structures, specific architectural and micro architectural details, specific register configurations, specific instruction types, specific system components, specific measurements/heights, specific processor pipeline stages and operation, specific interfaces, specific techniques, etc. in order to provide a thorough understanding of the present disclosure. It will be apparent, however, to those skilled in the art that these specific details need not be employed to practice the subject matter of the present disclosure. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic, and other specific operational details of computer systems haven't been described in detail in order to avoid unnecessarily obscuring the present disclosure.

Although the following embodiments may be described with reference to energy conservation and energy efficiency in specific integrated circuits, such as in computing platforms or microprocessors, other embodiments are applicable to other types of integrated circuits and logic devices. Similar techniques and teachings of embodiments described herein may be applied to other types of circuits or semiconductor devices that may also benefit from better energy efficiency and energy conservation. For example, the disclosed embodiments are not limited to desktop computer systems or Ultrabooks™. And may be also used in other devices, such as handheld devices, tablets, other thin notebooks, systems on a chip (SOC) devices, and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that can perform the functions and operations taught below. Moreover, the apparatus', methods, and systems described herein are not limited to physical computing devices, but may also relate to software optimizations for energy conservation and efficiency. As will become readily apparent in the description below, the embodiments of methods, apparatus', and systems described herein (whether in reference to hardware, firmware, software, or a combination thereof) are vital to a 'green technology' future balanced with performance considerations.

As computing systems are advancing, the components therein are becoming more complex. As a result, the interconnect architecture to couple and communicate between the components is also increasing in complexity to ensure bandwidth requirements are met for optimal component operation. Furthermore, different market segments demand different aspects of interconnect architectures to suit the market's needs. For example, servers require higher performance, while the mobile ecosystem is sometimes able to sacrifice overall performance for power savings. Yet, it's a singular purpose of most fabrics to provide highest possible performance with maximum power saving. Below, a number of interconnects are discussed, which would potentially benefit from aspects of the disclosure described herein.

One interconnect fabric architecture includes the Peripheral Component Interconnect (PCI) Express (PCIe) architecture. A primary goal of PCIe is to enable components and devices from different vendors to inter-operate in an open architecture, spanning multiple market segments; Clients (Desktops and Mobile), Servers (Standard, Rack Scale, and Enterprise), and Embedded and Communication devices. PCI Express is a high performance, general purpose I/O interconnect defined for a wide variety of future computing and communication platforms. Some PCI attributes, such as its usage model, load-store architecture, and software interfaces, have been maintained through its revisions, whereas previous parallel bus implementations have been replaced by a highly scalable, fully serial interface. The more recent versions of PCI Express take advantage of advances in point-to-point interconnects, Switch-based technology, and packetized protocol to deliver new levels of performance and features. Power Management, Quality Of Service (QoS), Hot-Plug/Hot-Swap support, Data Integrity, and Error Handling are among some of the advanced features supported by PCI Express.

Referring to FIG. 1, an embodiment of a fabric composed of point-to-point links that interconnect a set of components is illustrated. A system 100 includes processor 105 and system memory 110 coupled to controller hub 115. Processor 105 includes any processing element, such as a microprocessor, a host processor, an embedded processor, a co-processor, or other processor. Processor 105 is coupled to controller hub 115 through a link 106 (e.g., a front-side bus (FSB)). In one embodiment, link 106 may be a serial point-to-point interconnect as described below. In another embodiment, link 106 includes a serial, differential interconnect architecture that is compliant with different interconnect standard. In some implementations, the system may include logic to implement multiple protocol stacks and further logic to negotiation alternate protocols to be run on top of a common physical layer, among other example features.

System memory 110 includes any memory device, such as random access memory (RAM), non-volatile (NV) memory, or other memory accessible by devices in system 100. System memory 110 is coupled to controller hub 115 through memory interface 116. Examples of a memory interface include a double-data rate (DDR) memory interface, a dual-channel DDR memory interface, and a dynamic RAM (DRAM) memory interface.

In one embodiment, controller hub 115 is a root hub, root complex, or root controller in a Peripheral Component Interconnect Express (PCIe or PCIE) interconnection hierarchy. Examples of controller hub 115 include a chipset, a memory controller hub (MCH), a northbridge, an interconnect controller hub (ICH) a southbridge, and a root controller/hub. Often the term chipset refers to two physically separate controller hubs, i.e. a memory controller hub (MCH) coupled to an interconnect controller hub (ICH). Note that current systems often include the MCH integrated with processor 105, while controller hub 115 is to communicate with I/O devices, in a similar manner as described below. In some embodiments, peer-to-peer routing is optionally supported through controller hub 115 (e.g., root complex).

Here, controller hub 115 is coupled to switch/bridge 120 through serial link 119. Input/output modules 117 and 121, which may also be referred to as interfaces/ports 117 and 121, include/implement a layered protocol stack to provide communication between controller hub 115 and switch 120. In one embodiment, multiple devices are capable of being coupled to switch 120.

Switch/bridge 120 routes packets/messages from device 125 upstream, i.e. up a hierarchy towards a root complex, to controller hub 115 and downstream, i.e. down a hierarchy away from a root controller, from processor 105 or system memory 110 to device 125. Switch 120, in one embodiment, is referred to as a logical assembly of multiple virtual PCI-to-PCI bridge devices. Device 125 includes any internal or external device or component to be coupled to an electronic system, such as an I/O device, a Network Interface Controller (NIC), an add-in card, an audio processor, a network processor, a hard-drive, a storage device, a CD/DVD ROM, a monitor, a printer, a mouse, a keyboard, a router, a portable storage device, a Firewire device, a Universal Serial Bus (USB) device, a scanner, and other input/output devices. Often in the PCIe vernacular, such as device, is referred to as an endpoint. Although not specifically shown, device 125 may include a PCIe to PCI/PCI-X bridge to support legacy or other version PCI devices. Endpoint devices in PCIe are often classified as legacy, PCIe, or root complex integrated endpoints.

Graphics accelerator 130 is also coupled to controller hub 115 through serial link 132. In one embodiment, graphics accelerator 130 is coupled to an MCH, which is coupled to an ICH. Switch 120, and accordingly I/O device 125, is then coupled to the ICH. I/O modules 131 and 118 are also to implement a layered protocol stack to communicate between graphics accelerator 130 and controller hub 115. Similar to the MCH discussion above, a graphics controller or the graphics accelerator 130 itself may be integrated in processor 105. Further, one or more links (e.g., 123) of the system can include one or more extension devices (e.g., 150), such as retimers, repeaters, etc. It should be appreciated that one or more of the components (e.g., 105, 110, 115, 120, 125, 130) illustrated in FIG. 1 can be enhanced to execute, store, and/or embody logic to implement one or more of the features described herein.

Figure 2:
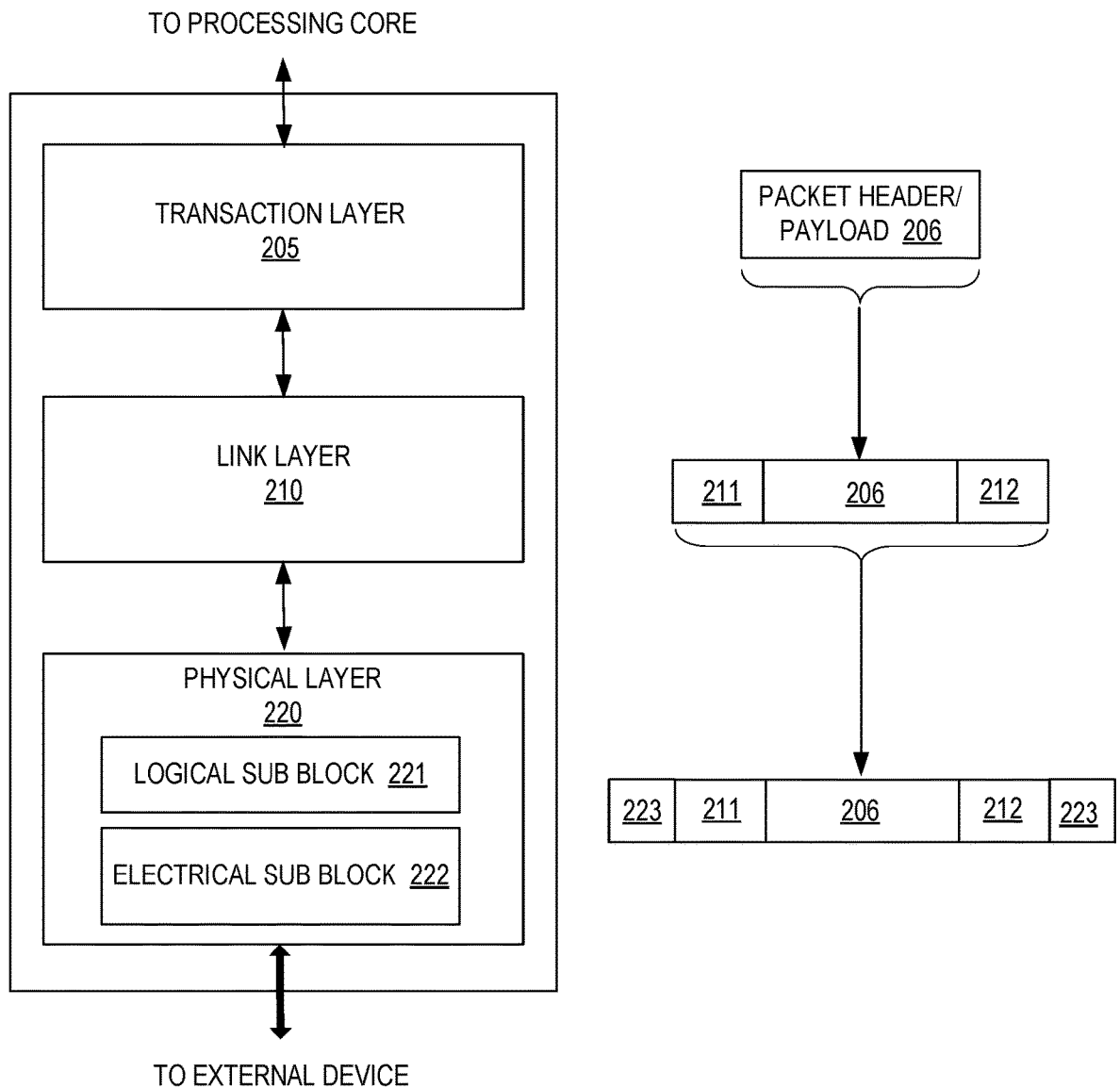
FIG. 2 illustrates an embodiment of an interconnect architecture including a layered stack.

Turning to FIG. 2 an embodiment of a layered protocol stack is illustrated, which may be implemented in one or more components of a mobile computing device, such as an application processor or baseband processor or modem, among other examples. Layered protocol stack 200 includes logic implemented in hardware circuitry and/or software to implement any form of a layered communication stack, such as a Quick Path Interconnect (QPI) stack, a PCIe stack, a next generation high performance computing interconnect stack, or other layered stack. Although the discussion immediately below in reference to FIGS. 1-4 are in relation to a PCIe stack, similar concepts may be applied to other interconnect stacks, such as OpenCAPI™, Gen-Z™, UPI, Universal Serial Bus, (USB), Cache Coherent Interconnect for Accelerators (CCIX™), Advanced Micro Device™'s (AMD™) Infinity™, Common Communication Interface (CCI), or Qualcomm™'s Centriq™ interconnect, among others. In one embodiment, protocol stack 200 is a PCIe protocol stack including transaction layer 205, link layer 210 (also referred to herein as 'data link layer'), and physical layer 220. An interface, such as interfaces 117, 118, 121, 122, 126, and 131 in FIG. 1, may be represented as communication protocol stack 200. Representation as a communication protocol stack may also be referred to as a module or interface implementing/including a protocol stack.

PCI Express uses packets to communicate information between components. Packets are formed in the transaction layer 205 and data link layer 210 to carry the information from the transmitting component to the receiving component. As the transmitted packets flow through the other layers, they are extended with additional information necessary to handle packets at those layers. At the receiving side the reverse process occurs and packets get transformed from their physical layer 220 representation to the data link layer 210 representation and finally (for transaction layer packets) to the form that can be processed by the transaction layer 205 of the receiving device.

Transaction Layer

In one embodiment, transaction layer 205 is to provide an interface between a device's processing core and the interconnect architecture, such as data link layer 210 and physical layer 220. In this regard, a primary responsibility of the transaction layer 205 is the assembly and disassembly of packets (i.e., transaction layer packets, or TLPs). The transaction layer 205 typically manages credit-based flow control for TLPs. PCIe implements split transactions, i.e. transactions with request and response separated by time, allowing a link to carry other traffic while the target device gathers data for the response.

In addition, PCIe utilizes credit-based flow control. In this scheme, a device advertises an initial amount of credit for each of the receive buffers in transaction layer 205. An external device at the opposite end of the link, such as controller hub 115 in FIG. 1, counts the number of credits consumed by each TLP. A transaction may be transmitted if the transaction does not exceed a credit limit. Upon receiving a response an amount of credit is restored. An advantage of a credit scheme is that the latency of credit return does not affect performance, provided that the credit limit is not encountered.

In one embodiment, four transaction address spaces include a memory address space, a configuration address space, a message address space, and an input/output address space. Memory space transactions include one or more of read requests and write requests to transfer data to/from a memory-mapped location. In one embodiment, memory space transactions are capable of using two different address formats, e.g., a short address format, such as a 32-bit address, or a long address format, such as 64-bit address. Configuration space transactions are used to access configuration space of the PCIe devices. Transactions to the configuration space include read requests and write requests. Message space transactions (or, simply messages) are defined to support in-band communication between PCIe agents.

Therefore, in one embodiment, transaction layer 205 assembles packet header/payload 206. Format for current packet headers/payloads may be found in the PCIe specification at the PCIe specification website (indeed any reference herein to a portion of the PCIe specification may contemplate any past, current, or future PCIe specification currently available or available in the future at the PCIe specification website or through other means).

Figure 3:
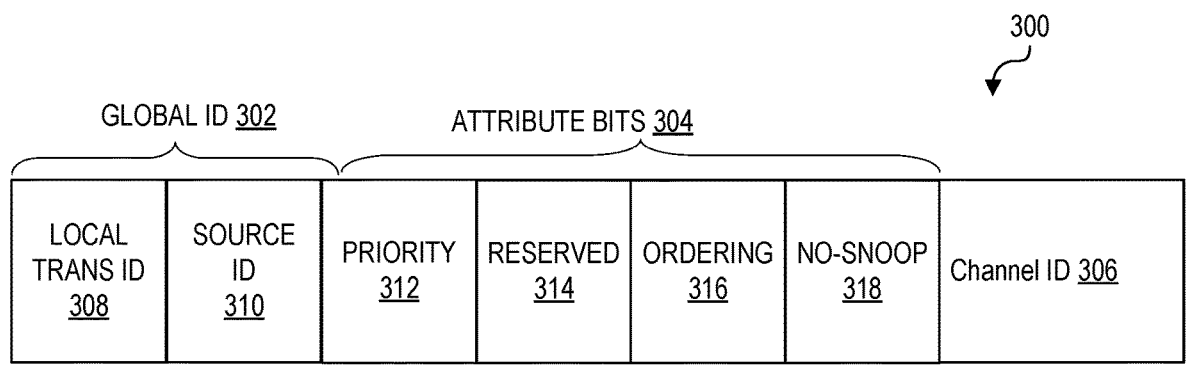
FIG. 3 illustrates an embodiment of a request or packet to be generated or received within an interconnect architecture.

Quickly referring to FIG. 3, an embodiment of a PCIe transaction descriptor is illustrated. In one embodiment, transaction descriptor 300 is a mechanism for carrying transaction information. In this regard, transaction descriptor 300 supports identification of transactions in a system. Other potential uses include tracking modifications of default transaction ordering and association of transaction with channels.

Transaction descriptor 300 includes global identifier field 302, attributes field 304 and channel identifier field 306. In the illustrated example, global identifier field 302 is depicted comprising local transaction identifier field 308 and source identifier field 310. In one embodiment, global identifier field 302 is unique for all outstanding requests.

According to one implementation, local transaction identifier field 308 is a field generated by a requesting agent, and it is unique for all outstanding requests that require a completion for that requesting agent. Furthermore, in this example, source identifier 310 uniquely identifies the requestor agent within a PCIe hierarchy. Accordingly, together with source ID 310, local transaction identifier 308 field provides global identification of a transaction within a hierarchy domain.

Attributes field 304 specifies characteristics and relationships of the transaction. In this regard, attributes field 304 is potentially used to provide additional information that allows modification of the default handling of transactions. In one embodiment, attributes field 304 includes priority field 312, reserved field 314, ordering field 316, and no-snoop field 318. Here, priority sub-field 312 may be modified by an initiator to assign a priority to the transaction. Reserved attribute field 314 is left reserved for future, or vendor-defined usage. Possible usage models using priority or security attributes may be implemented using the reserved attribute field.

In this example, ordering attribute field 316 is used to supply optional information conveying the type of ordering that may modify default ordering rules. According to one example implementation, an ordering attribute of "0" denotes default ordering rules are to apply, wherein an ordering attribute of "1" denotes relaxed ordering, wherein writes can pass writes in the same direction, and read completions can pass writes in the same direction. Snoop attribute field 318 is utilized to determine if transactions are snooped. As shown, channel ID Field 306 identifies a channel that a transaction is associated with.

Link Layer

With reference again to FIG. 2, link layer 210, also referred to as data link layer 210, acts as an intermediate stage between transaction layer 205 and the physical layer 220. In one embodiment, a responsibility of the data link layer 210 is providing a reliable mechanism for exchanging Transaction Layer Packets (TLPs) between two components of a link. One side of the Data Link Layer 210 accepts TLPs assembled by the Transaction Layer 205, applies packet sequence identifier 211, i.e. an identification number or packet number, calculates and applies an error detection code, i.e. CRC 212, and submits the modified TLPs to the Physical Layer 220 for transmission across a physical to an external device.

Physical Layer

In one embodiment, physical layer 220 includes logical sub-block 221 and electrical sub-block 222 to physically transmit a packet to an external device. Here, logical sub-block 221 is responsible for the "digital" functions of physical layer 220. In this regard, the logical sub-block includes a transmit section to prepare outgoing information for transmission by electrical sub-block 222, and a receiver section to identify and prepare received information before passing it to the link layer 210.

Physical layer 220 includes a transmitter and a receiver. The transmitter is supplied by logical sub-block 221 with symbols, which the transmitter serializes and transmits onto to an external device. The receiver is supplied with serialized symbols from an external device and transforms the received signals into a bit-stream. The bit-stream is de-serialized and supplied to logical sub-block 221. In one embodiment, an 8b/10b transmission code is employed, where ten-bit symbols are transmitted/received. In other embodiments 128b/130b transmission coding is used, among other examples. Here, special symbols are used to frame a packet with frames 223. In addition, in one example, the receiver also provides a symbol clock recovered from the incoming serial stream.

As stated above, although transaction layer 205, link layer 210, and physical layer 220 are discussed in reference to a specific embodiment of a PCIe protocol stack, a layered protocol stack is not so limited. In fact, any layered protocol may be included/implemented. As an example, a port/interface that is represented as a layered protocol includes: (1) a first layer to assemble packets, i.e. a transaction layer; a second layer to sequence packets, i.e. a link layer; and a third layer to transmit the packets, i.e. a physical layer. As a specific example, a common standard interface (CSI) layered protocol is utilized.

Figure 4:
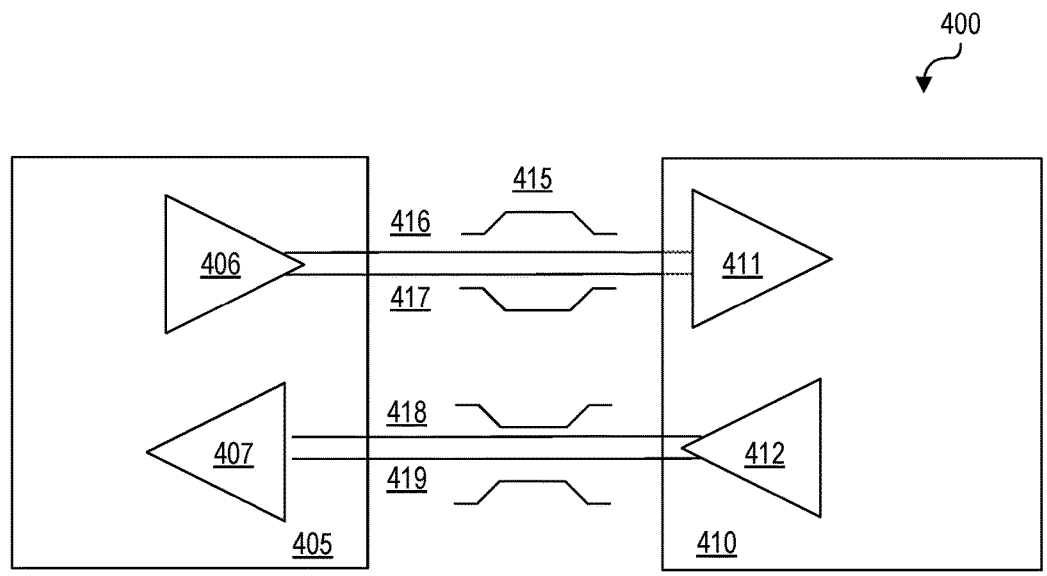
FIG. 4 illustrates an embodiment of a transmitter and receiver pair for an interconnect architecture.

Referring next to FIG. 4, an embodiment of a PCIe serial point to point fabric is illustrated. Although an embodiment of a PCIe serial point-to-point link is illustrated, a serial point-to-point link is not so limited, as it includes any transmission path for transmitting serial data. In the embodiment shown, a basic PCIe link includes two, low-voltage, differentially driven signal pairs: a transmit pair 406/411 and a receive pair 412/407. Accordingly, device 405 includes transmission logic 406 to transmit data to device 410 and receiving logic 407 to receive data from device 410. In other words, two transmitting paths, i.e. paths 416 and 417, and two receiving paths, i.e. paths 418 and 419, are included in a PCIe link.

A transmission path refers to any path for transmitting data, such as a transmission line, a copper line, an optical line, a wireless communication channel, an infrared communication link, or other communication path. A connection between two devices, such as device 405 and device 410, is referred to as a link, such as link 415. A link may support one lane—each lane representing a set of differential signal pairs (one pair for transmission, one pair for reception). To scale bandwidth, a link may aggregate multiple lanes denoted by xN, where N is any supported Link width, such as 1, 2, 4, 8, 12, 16, 32, 64, or wider.

A differential pair refers to two transmission paths, such as lines 416 and 417, to transmit differential signals. As an example, when line 416 toggles from a low voltage level to a high voltage level, i.e. a rising edge, line 417 drives from a high logic level to a low logic level, i.e. a falling edge. Differential signals potentially demonstrate better electrical characteristics, such as better signal integrity, i.e. cross-coupling, voltage overshoot/undershoot, ringing, etc. This allows for better timing window, which enables faster transmission frequencies.

In some implementations, a high-performance interconnect and corresponding interconnect protocol (e.g., such as a next generation PCIe-based interconnect) may be provided that is capable of operating at high speeds such as 25 GT/s and/or 32 GT/s. In one example, two speeds may be defined for the high performance interconnect, one at 25 GT/s and 32 GT/s, based on the characteristics determined for the channel (e.g., during link training). The interconnect, in one implementation, may be backwards compatible with existing PCIe generations and speeds provided for these generations (e.g., 8 GT/s, 16 GT/s, etc.).

Figure 5:
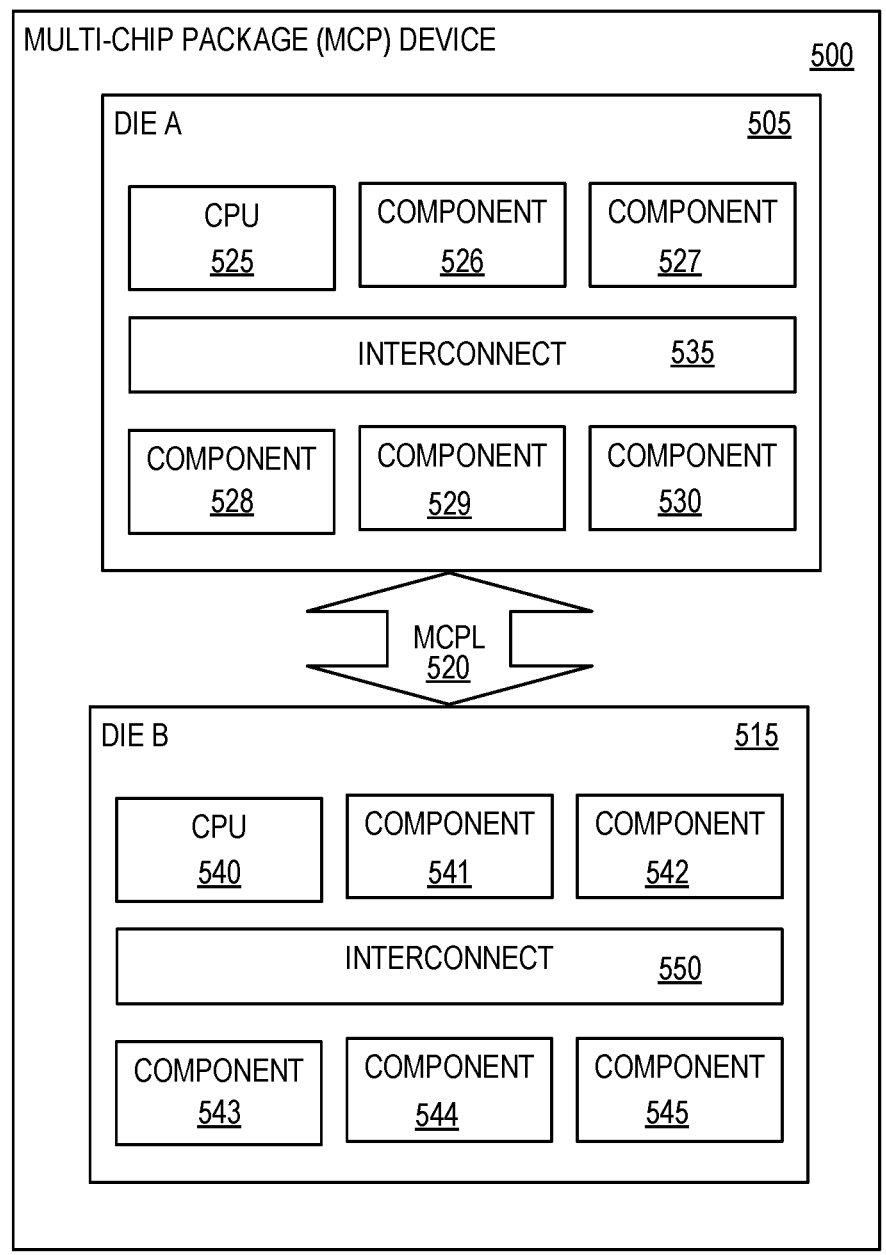
FIG. 5 illustrates an example multi-chip package device.

FIG. 5 is a simplified block diagram illustrating an example multi-chip package (MCP) device 500. The device 500 may be implemented on a single package and include two or more chips, or dies, (e.g., 505, 510) communicatively connected using an example multi-chip package link (MCPL) 520. While FIG. 5 illustrates an example of two (or more) dies that are interconnected using an example MCPL 520, it should be appreciated that the principles and features described herein regarding implementations of an MCPL can be applied to any interconnect or link connecting a die (e.g., 505) and other components, including connecting two or more dies (e.g., 505, 510), connecting a die (or chip) to another component off-die, connecting a die to another device or die off-package (e.g., 500), connecting die to a BGA package, implementation of a Patch on Interposer (POINT), among potentially other examples.

Generally, a multi-chip package device (e.g., 500) can be an electronic package where multiple integrated circuits (ICs), semiconductor dies or other discrete components (e.g., 505, 510) are packaged onto a unifying substrate (e.g., silicon or other semiconductor substrate), facilitating the combined components' use as a single component (e.g., as though a larger IC). In some instances, the larger components (e.g., dies 505, 510) can themselves be IC systems, such as systems on chip (SoC), multiprocessor chips, or other components that include multiple components (e.g., 525-530 and 540-545) on the device, for instance, on a single die (e.g., 505, 510).

Dies and other components within a multi-chip package device 500 can themselves include interconnect or other communication fabrics (e.g., 535, 550) providing the infrastructure for communication between components (e.g., 525-530 and 540-545) within the device (e.g., 505, 510 respectively). The various components and interconnects (e.g., 535, 550) may potentially support or use multiple different protocols. Further, communication between dies (e.g., 505, 510) can potentially include transactions between the various components on the dies over multiple different protocols. It should be further noted that a variety of different, competing and proprietary interconnect solutions have been developed (e.g., R-Link, multi-chip package link (MCPL), high bandwidth memory (HBM2), double data rate (DDR), etc.) for application in MCP devices (e.g., 500) to facilitate both the interconnects (e.g., 520) between chips (or dies) and to interconnect components (e.g., 525-530, 540-545) within the chips (e.g., 505, 510). Designing mechanisms to provide communication between chips (or dies) on a multi-chip package can be challenging, with traditional solutions employing highly specialized, expensive, and package-specific solutions based on the specific combinations of components (and desired transactions) sought to be interconnected.

The examples, systems, algorithms, apparatus, logic, and features described within this Specification can address at least some of the issues identified above, including potentially many others not explicitly mentioned herein. For instance, in some implementations, an approximate data bus inversion technique for latency sensitive applications can be provided for a multi-chip package link (MCPL), which may be a high bandwidth, low power, low latency interface to connect a host device (e.g., a CPU) or other device to a companion chip that sits in the same package as the host. Such an MCPL can reduce latency and limit simultaneous switching output (SSO) noise.

Figure 6:
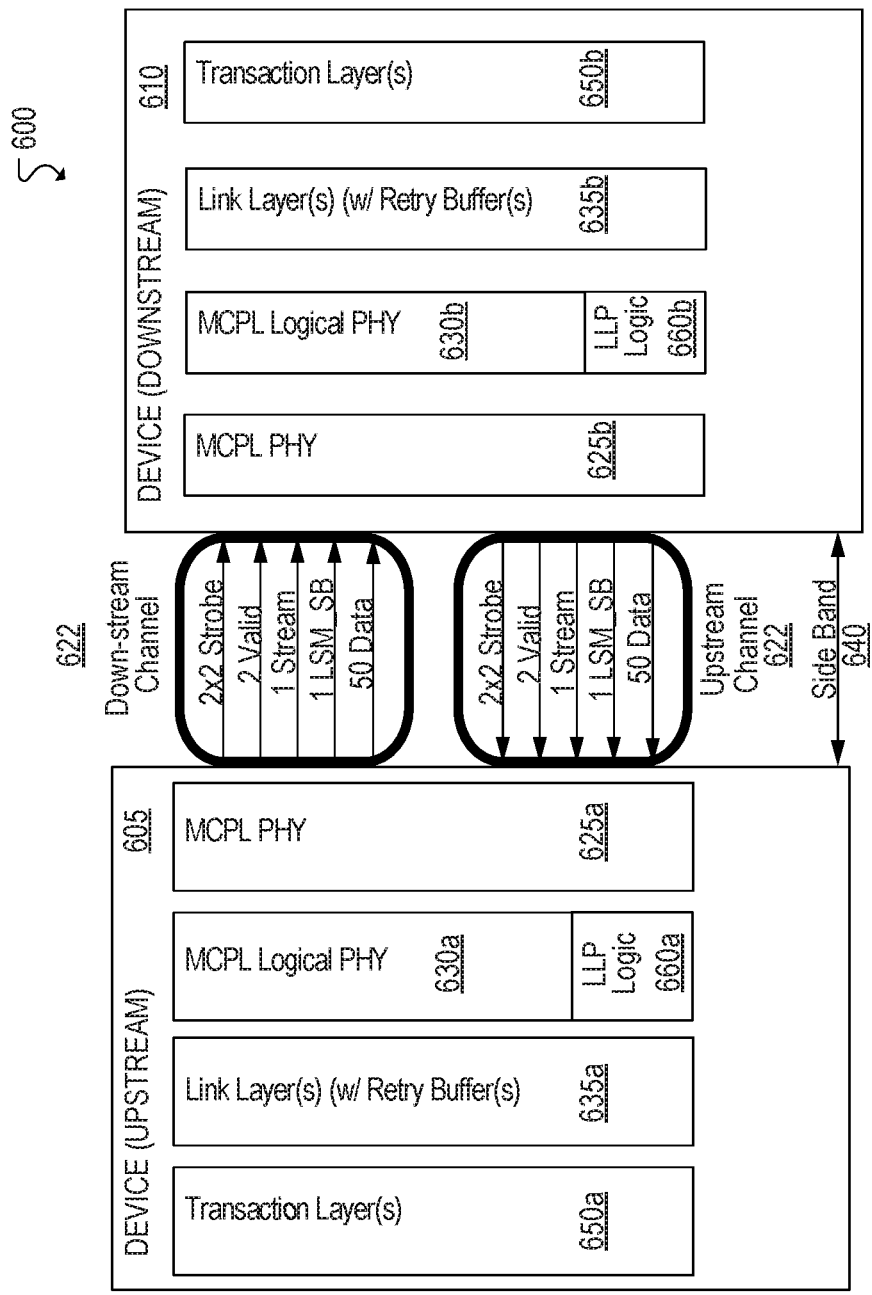
FIG. 6 is a simplified block diagram of a multi-chip package link (MCPL).

Turning to FIG. 6, a simplified block diagram 600 is shown representing at least a portion of a system including an example implementation of a multi-chip package link (MCPL). An MCPL can be implemented using physical electrical connections (e.g., wires implemented as lanes of a bus/channel) connecting a first device 605 (e.g., a first die including one or more sub-components) with a second device 610 (e.g., a second die including one or more other sub-components). In the particular example shown in the high-level representation of diagram 600, all signals (in channels 622, 624) can be unidirectional and lanes can be provided for the data signals to have both an upstream and downstream data transfer. While the block diagram 600 of FIG. 6, refers to the first component 605 as the upstream component and the second component 610 as the downstream component, and physical lanes of the MCPL used in sending data as a downstream channel 622 and lanes used for receiving data (from device 610) as an upstream channel 624, it should be appreciated that the MCPL between devices 605, 610 can be used by each device to both send and receive data between the devices.

In one example implementation, an MCPL can provide a physical layer (PHY) including the electrical MCPL PHY 625a,b (or, collectively, 625) and executable logic implementing MCPL logical PHY 630a,b (or, collectively, 630). Electrical, or physical, PHY 625 can provide the physical connection over which data is communicated between devices 605, 610. Signal conditioning components and logic can be implemented in connection with the physical PHY 625 in order to establish high data rate and channel configuration capabilities of the link, which in some applications can involve tightly clustered physical connections at lengths of approximately 45 mm or more. The logical PHY 630 can include logic for facilitating clocking, link state management (e.g., for link layers 635a, 635b), and protocol multiplexing between potentially multiple, different protocols used for communications over the MCPL.

In one example implementation, physical PHY 625 can include, for each channel (e.g., 622, 624) a set of data lanes, over which in-band data can be sent. In this particular example, 50 data lanes are provided in each of the upstream and downstream channels 622, 624, although any other number of lanes can be used as permitted by the layout and power constraints, desired applications, device constraints, etc. Each channel can further include one or more dedicated lanes for a strobe, or clock, signal for the channel, one or more dedicated lanes for a valid signal for the channel, one or more dedicated lanes for a stream signal, and one or more dedicated lanes for a link state machine management or sideband signal. The physical PHY can further include a sideband link 640, which, in some examples, can be a bi-directional lower frequency control signal link used to coordinate state transitions and other attributes of the MCPL connecting devices 605, 610, among other examples.

In some implementations, in-band data (and other data) sent over the MCPL can be scrambled. In one example, the data can be scrambled, on each lane, using a pseudo random binary sequence (PRBS). In some implementations, the PRBS can be generated to be scrambled with outbound data using a linear feedback shift register (LFSR). A receiving device can unscramble the data to view the data in the clear, among other examples.

As noted above, multiple protocols can be supported using an implementation of MCPL. Indeed, multiple, independent transaction layers 650a, 650b can be provided at each device 605, 610. For instance, each device 605, 610 may support and utilize two or more protocols, such as PCI, PCIe, QPI, Intel In-Die Interconnect (IDI), among others. IDI is a coherent protocol used on-die to communicate between cores, Last Level Caches (LLCs), memory, graphics, and IO controllers. Other protocols can also be supported including Ethernet protocol, Infiniband protocols, and other PCIe fabric based protocols. The combination of the Logical PHY and physical PHY can also be used as a die-to-die interconnect to connect a SerDes PHY (PCIe, Ethernet, Infiniband or other high speed SerDes) on one Die to its upper layers that are implemented on the other die, among other examples.

Logical PHY 630 can support multiplexing between these multiple protocols on an MCPL. For instance, the dedicated stream lane can be used to assert an encoded stream signal that identifies which protocol is to apply to data sent substantially concurrently on the data lanes of the channel. Further, logical PHY 630 can be used to negotiate the various types of link state transitions that the various protocols may support or request. In some instances, LSM_SB signals sent over the channel's dedicated LSM_SB lane can be used, together with side band link 640 to communicate and negotiate link state transitions between the devices 605, 610. Further, data bus inversion (DBI), link training, error detection, skew detection, de-skewing, and other functionality of traditional interconnects can be replaced or governed, in part using logical PHY 630. For instance, valid signals sent over one or more dedicated valid signal lanes in each channel can be used to signal link activity, detect skew, link errors, and realize other features, among other examples. In the particular example of FIG. 6, multiple valid lanes are provided per channel. For instance, data lanes within a channel can be bundled or clustered (physically and/or logically) and a valid lane can be provided for each cluster. Further, multiple strobe lanes can be provided, in some cases, also to provide a dedicated strobe signal for each cluster in a plurality of data lane clusters in a channel, among other examples.

As noted above, logical PHY 630 can be used to negotiate and manage link control signals sent between devices connected by the MCPL. In some implementations, logical PHY 630 can include link layer packet (LLP) generation logic 660 that can be used to send link layer control messages over the MCPL (i.e., in band). Such messages can be sent over data lanes of the channel, with the stream lane identifying that the data is link layer-to-link layer messaging, such as link layer control data, among other examples. Link layer messages enabled using LLP logic 660 can assist in the negotiation and performance of link layer state transitioning, power management, loopback, disable, re-centering, scrambling, among other link layer features between the link layers 635a, 635b of devices 605, 610 respectively.

Figure 7:
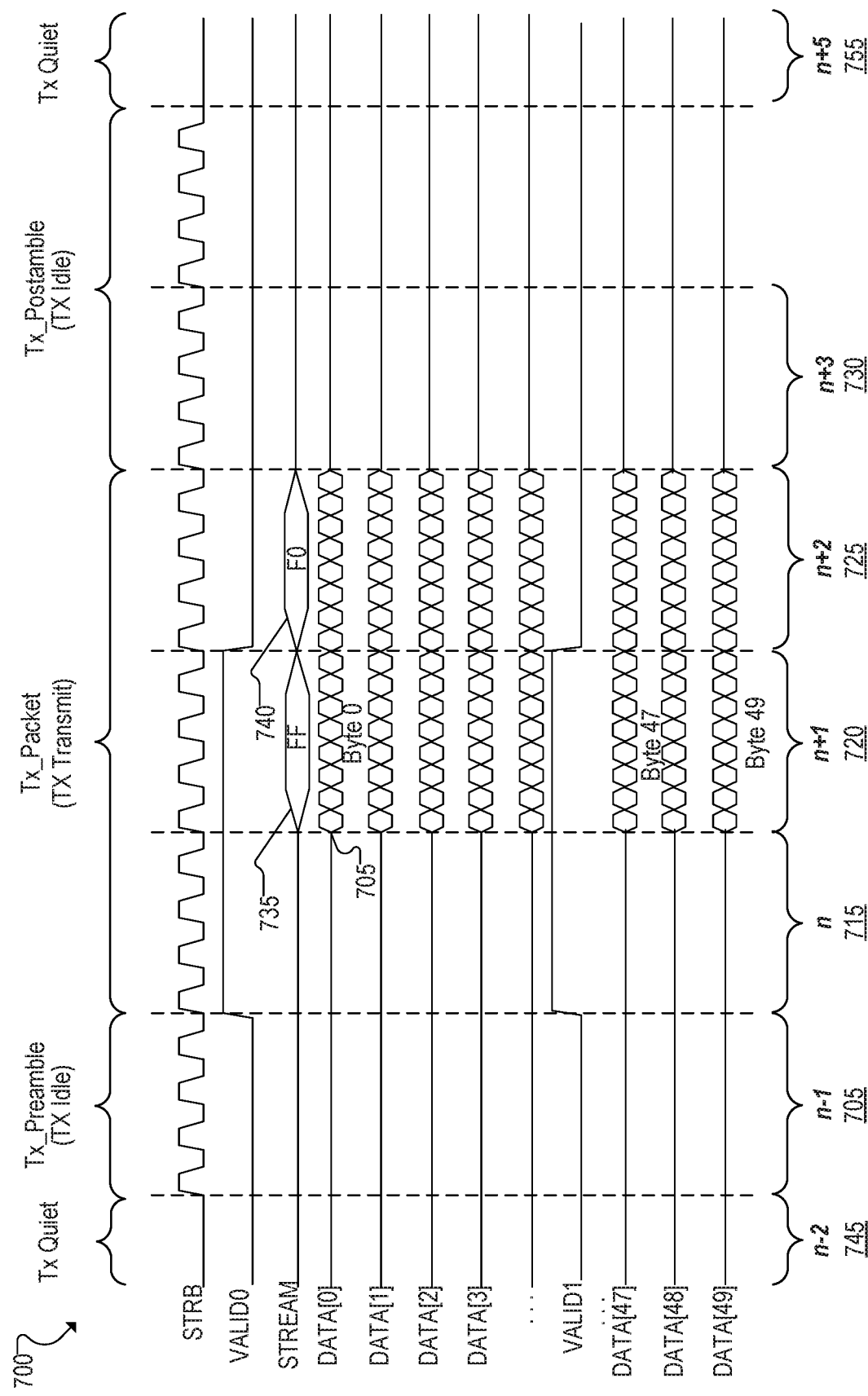
FIG. 7 is a representation of example signaling on an example MCPL.

Turning to FIG. 7, a diagram 700 is shown representing example signaling using a set of lanes (e.g., 622, 624) in a particular channel of an example MCPL. In the example of FIG. 7, two clusters of twenty-five (25) data lanes are provided for fifty (50) total data lanes in the channel. A portion of the lanes are shown, while others (e.g., DATA[4-46] and a second strobe signal lane (STRB)) are omitted (e.g., as redundant signals) for convenience in illustrating the particular example. When the physical layer is in an active state (e.g., not powered off or in a low power mode (e.g., an L1 state)), strobe lanes (STRB) can be provided with a synchronous clock signal. In some implementations, data can be sent on both the rising and falling edges of the strobe. Each edge (or half clock cycle) can demarcate a unit interval (UI). Accordingly, in this example, a bit (e.g., 705) can be sent on each lane, allowing for a byte to be sent every 8UI. A byte time period can be defined as 8UI, or the time for sending a byte on a single one of the data lanes (e.g., DATA[0-49]).

In some implementations, a valid signal, sent on one or more dedicated valid signal channels (e.g., VALID0, VALID1), can serve as a leading indicator for the receiving device to identify, when asserted (high), to the receiving device, or sink, that data is being sent from the sending device, or source, on data lanes (e.g., DATA[0-49]) during the following time period. Alternatively, when the valid signal is low, the source indicates to the sink that the sink will not be sending data on the data lanes during the following time period. Accordingly, when the sink logical PHY detects that the valid signal is not asserted (e.g., on lanes VALID0 and VALID1), the sink can disregard any data that is detected on the data lanes (e.g., DATA[0-49]) during the following time period. For instance, cross talk noise or other bits may appear on one or more of the data lanes when the source, in fact, is not sending any data. By virtue of a low, or non-asserted, valid signal during the previous time period (e.g., the previous byte time period), the sink can determine that the data lanes are to be disregarded during the following time period.

Data sent on each of the lanes of the MCPL can be strictly aligned to the strobe signal. A time period can be defined based on the strobe, such as a byte time period, and each of these periods can correspond to a defined window in which signals are to be sent on the data lanes (e.g., DATA[0-49]), the valid lanes (e.g., VALID0, VALID1), and stream lane (e.g., STREAM). Accordingly, alignment of these signals can enable identification that a valid signal in a previous time period window applies to data in the following time period window, and that a stream signal applies to data in the same time period window. The stream signal can be an encoded signal (e.g., 1 byte of data for a byte time period window), that is encoded to identify the protocol that applies to data being sent during the same time period window.

To illustrate, in the particular example of FIG. 7, a byte time period window is defined. A valid signal is asserted at a time period window n (715), before any data is injected on data lanes DATA[0-49]. At the following time period window n+1 (720) data is sent on at least some of the data lanes. In this case, data is sent on all fifty data lanes during n+1 (720). Because a valid signal was asserted for the duration of the preceding time period window n (715), the sink device can validate the data received on data lanes DATA[0-49] during time period window n+1 (720). Additionally, the leading nature of the valid signal during time period window n (715) allows the receiving device to prepare for the incoming data. Continuing with the example of FIG. 7, the valid signal remains asserted (on VALID0 and VALID1) during the duration of time period window n+1 (720), causing the sink device to expect the data sent over data lanes DATA[0-49] during time period window n+2 (725). If the valid signal were to remain asserted during time period window n+2 (725), the sink device could further expect to receive (and process) additional data sent during an immediately subsequent time period window n+3 (730). In the example of FIG. 7, however, the valid signal is de-asserted during the duration of time period window n+2 (725), indicating to the sink device that no data will be sent during time period window n+3 (730) and that any bits detected on data lanes DATA[0-49] should be disregarded during time period window n+3 (730).

As noted above, multiple valid lanes and strobe lanes can be maintained per channel. This can assist, among other advantages, with maintaining circuit simplicity and synchronization amid the clusters of relatively lengthy physical lanes connecting the two devices. In some implementations, a set of data lanes can be divided into clusters of data lanes. For instance, in the example of FIG. 7, data lanes DATA[0-49] can be divided into two twenty-five lane clusters and each cluster can have a dedicated valid and strobe lane. For instance, valid lane VALID0 can be associated with data lanes DATA[0-24] and valid lane VALID1 can be associated with data lanes DATA[25-49]. The signals on each "copy" of the valid and strobe lanes for each cluster can be identical.

As introduced above, data on stream lane STREAM can be used to indicate to the receiving logical PHY what protocol is to apply to corresponding data being sent on data lanes DATA[0-49]. In the example of FIG. 7, a stream signal is sent on STREAM during the same time period window as data on data lanes DATA[0-49] to indicate the protocol of the data on the data lanes. In alternative implementations, the stream signal can be sent during a preceding time period window, such as with corresponding valid signals, among other potential modifications. However, continuing with the example of FIG. 7, a stream signal 735 is sent during time period window n+1 (720) that is encoded to indicate the protocol (e.g., PCIe, PCI, IDI, QPI, etc.) that is to apply to the bits sent over data lanes DATA[0-49] during time period window n+1 (720). Similarly, another stream signal 740 can be sent during the subsequent time period window n+2 (725) to indicate the protocol that applies to the bits sent over data lanes DATA[0-49] during time period window n+2 (725), and so on. In some cases, such as the example of FIG. 7 (where both stream signals 735, 740 have the same encoding, binary FF), data in sequential time period windows (e.g., n+1 (720) and n+2 (725)) can belong to the same protocol. However, in other cases, data in sequential time period windows (e.g., n+1 (720) and n+2 (725)) can be from different transactions to which different protocols are to apply, and stream signals (e.g., 735, 740) can be encoded accordingly to identify the different protocols applying to the sequential bytes of data on the data lanes (e.g., DATA [0-49]), among other examples.

In some implementations, a low power or idle state can be defined for the MCPL. For instance, when neither device on the MCPL is sending data, the physical layer (electrical and logical) of MCPL can go to an idle or low power state. For instance, in the example of FIG. 7, at time period window n−2 (745), the MCPL is in a quiet or idle state and the strobe is disabled to save power. The MCPL can transition out of low-power or idle mode, awaking the strobe at time period window time period window n−1 (e.g., 705). The strobe can complete a transmission preamble (e.g., to assist in waking and synchronizing each of the lanes of the channel, as well as the sink device), beginning the strobe signal prior to any other signaling on the other non-strobe lanes. Following this time period window n−1 (705), the valid signal can be asserted at time period window n (715) to notify the sink that data is forthcoming in the following time period window n+1 (720), as discussed above.

The MCPL may re-enter a low power or idle state (e.g., an L1 state) following the detection of idle conditions on the valid lanes, data lanes, and/or other lanes of the MCPL channel. For instance, no signaling may be detected beginning at time period window n+3 (730) and going forward. Logic on either the source or sink device can initiate transition back into a low power state leading again (e.g., time period window n+5 (755)) to the strobe going idle in a power savings mode, among other examples and principles (including those discussed later herein).

Electrical characteristics of the physical PHY can include one or more of single-ended signaling, half-rate forwarded clocking, matching of interconnect channel as well as on-chip transport delay of transmitter (source) and receiver (sink), optimized electrostatic discharge (ESD) protection, pad capacitance, among other features. Further, an MCPL can be implemented to achieve higher data rate (e.g., approaching 16 Gb/s) and energy efficiency characteristics than traditional package I/O solutions.

In single ended parallel links such as the MCPL of FIGS. 5-7 for example, power supply induced jitter is a major limiter in achieving higher data rates. An MCPL may involve a wide channel with tens, hundreds, or even more data lanes transmitting data in the same clock cycles. Power supply related events may occur as a function of how many lanes toggle (or transition) in each cycle or over a short period of time. With reference to FIG. 7, if the data to be transmitted across data lanes [0]-[49] (e.g., all 1s) was exactly the opposite of bits in those lanes in a previous clock cycle (e.g., all 0s), significant signal switching noise (SSO) could occur when each of the data lanes is transitioned to its opposite value (e.g., transitioned from 0 to 1). For example, switching all of the lanes [0]-[49] from 0s to 1s for a single clock cycle can cause the voltage to drop and result in transmission errors in the transmission of the 1s. Thus, a significant amount of power may be wasted due to bit transitions in the lanes from one clock cycle to the next clock cycle.

Data Bus Inversion (DBI) is a technique to reduce simultaneous switching (SSO) noise and power in single ended parallel links (e.g., DDR, MCPL, RLINK, HBM2, etc.). DBI can mitigate large amounts of wasted power due to transitions on data buses. DBI can be implemented in systems using direct current DBI (DC-DBI) for terminated input/outputs (IOs) or alternating current DBI (AC-DBI) for un-terminated IOs. In a DBI implementation, the state of the data to be transmitted may be inverted prior to transmission based on a predetermined encoding algorithm. In traditional DBI, data to be transmitted is inverted on a bus if more than half of the number of total lanes on the bus would otherwise be required to switch or transition their bit values in order to transmit the data in its noninverted form. This ensures that the number of lanes switching bit values (or transmitting a particular level) is capped at half the total lane count.

An encoding algorithm may be used to implement DBI to determine whether inversion is appropriate and if so, to invert the state of data prior to transmission. The encoding algorithm may set a threshold (also referred to herein as a transition threshold) to indicate the number of transitions (e.g., bit values in the data lanes from a previous clock cycle changing to different bit values of original data to be transmitted in a new clock cycle) that would be required to transmit the data. Meeting or exceeding the threshold can trigger inversion of the data to be transferred to avoid the required lane transitions. For example, a determination is made as to whether data to be transmitted on a given set of data lanes (e.g., n data lanes) will require more than half of the data lanes from the previous clock cycle to transition (e.g., required transitions>n/2) from one value to another (e.g., 1 to 0 or 0 to 1). If the transition threshold is met, then the data may be encoded in an inverted version to be transmitted on the lanes. The inverted data reduces the number of data lanes that require transitions. In addition, an inversion indicator (e.g., an additional lane) is asserted to let the receiving device know that it has to invert the bus to get the real data. The DBI technique allows a transmitter and receiver to minimize the switching of bit values in the data lanes between a previous clock cycle and a new clock cycle.

DBI requires an accurate count of the number of lanes switching or transmitting a level (0 or 1). For example, the proper operation of AC-DBI is dependent on finding the accurate count of lanes switching from a previous cycle to a new cycle. DBI is typically implemented using full adders and the number of lanes per DBI signal determines the number of full-adder levels required. Thus, as the number of lanes increase, the number of full-adder levels that are needed also increases. With multiple levels of full addition, carry propagation may introduce significant latency and determine the DBI signal generation delay. For example, in ripple carry adders (small area and power), the calculation delay is determined by carry propagation (e.g., a standard 16-bit ripple carry adder has a latency of 47 gate delays). In latency sensitive I/O links (e.g., multi-chip package link (MCPL)), this can constitute a significant portion of I/O latency. Other techniques like Carry Look Ahead adders and speculative adders can be used but implementation logic gets complicated and increases gate count (power) for more than a few bits.

While DBI can be useful to reduce SSO, the resulting increase in latency can becomes another problem that is particularly acute in latency-sensitive applications. In MCPL interfaces, for example, data rate and latency are critical metrics for the success of at least some products. MCPL is a die to die interconnect and is often used to send mesh signals across CPU core dies. Any increase in latency due to MCPL PHY compared to a monolithic mesh network implementation is a direct performance loss. Additionally, MCPL interface has a large lane count (required to send all the mesh signals), which can simultaneously switch causing significant SSO related droop and high frequency noise. This can reduce the link data rate and impact performance. Accordingly, it is desirable to reduce DBI related latency while also mitigating simultaneous switching events. Furthermore, a regular DBI assignment (i.e. lanes/DBI) is not always possible due to mesh signal distribution and activity factor. Thus, a flexible architecture is needed to avoid worst case SSO scenarios.

A system implemented to perform an approximate majority vote based DBI technique for latency sensitive applications can resolve many of these issues (and more). In one or more embodiments, majority vote logic based DBI signal generation is used to determine whether to assert DBI. This approach can limit SSO related noise in addition to significantly reducing latency that often occurs with traditional DBI. Instead of calculating an actual sum of the number of switching lanes, embodiments use a simple majority vote to determine whether a bus needs inversion or not. In one or more embodiments, majority vote logic is used to approximate whether a majority of data lanes have bit values from a previous clock cycle that are required to transition to different values based on new data to be transmitted by the data lanes in a new clock cycle. If it is determined that the majority of data lanes have bit values that need to be transitioned in order to transmit the new data in the new clock cycle, then inversion can be applied to encode the new data into inverted data to be transmitted by the data lanes. By approximating the determination of whether more than half the data lanes are required to transition to another value in order to transmit the original data, majority vote logic can be used, which consumes less resources than full adders used in an exact determination. Thus, latency can be significantly reduced while also significantly reducing SSO noise and power loss with the DBI.

The disclosed embodiments of an approximate majority vote based DBI technique reduces SSO noise while simultaneously significantly reducing latency caused by a conventional DBI technique. The approximate DBI technique disclosed herein can reduce gate delays in an MCPL interconnect to minimize performance loss due to latency. Additionally, using majority vote logic with data bus inversion enables flexibility in selecting the lane count per DBI. For example, the number of lanes to which DBI is applied and/or the transition threshold used to determine when inversion is applied can be adjusted or modulated based on particular implementations and needs. This flexible architecture of the approximate DBI technique ensures that the worst case SSO can be avoided without excessive latency.

Figure 8:
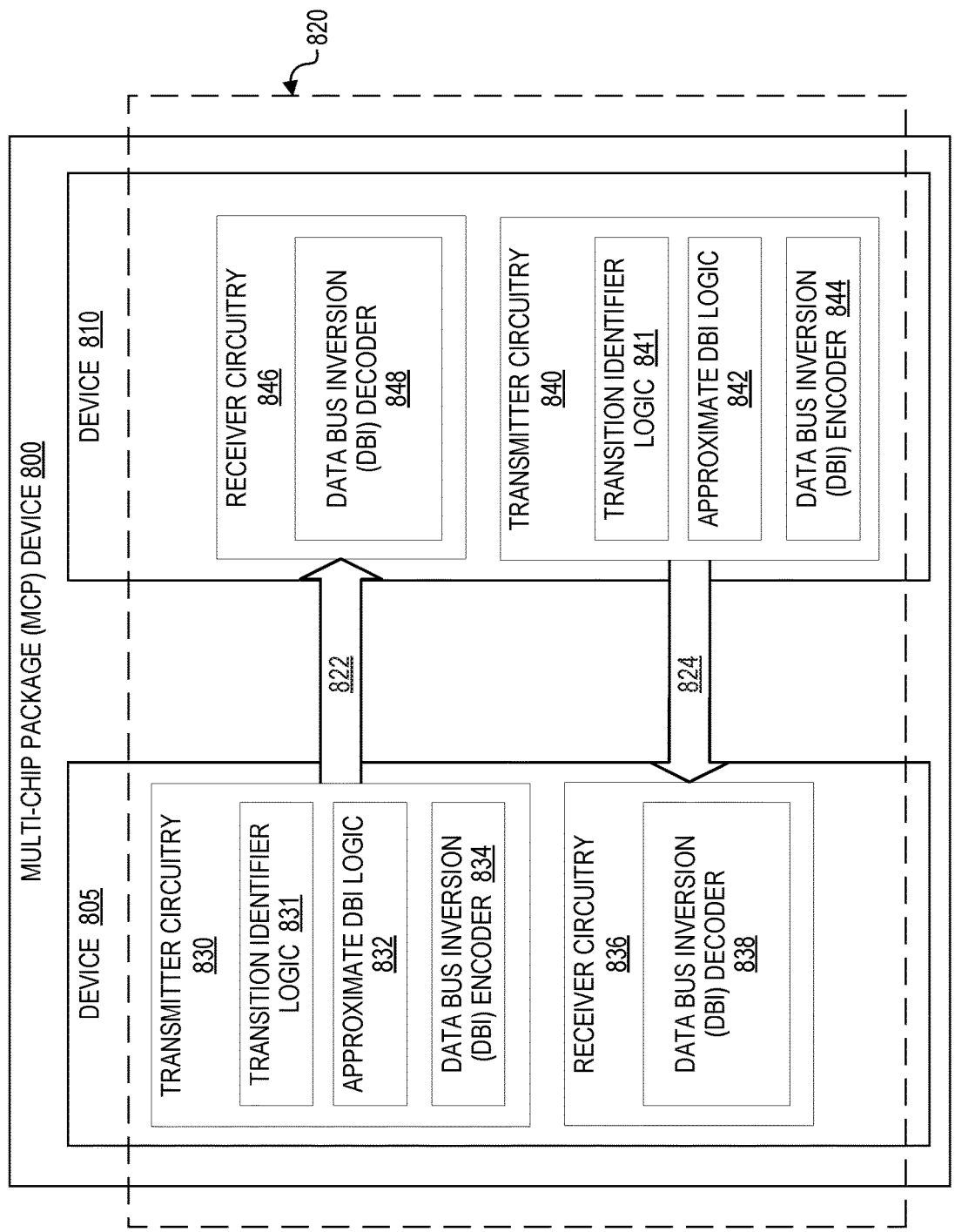
FIG. 8 is a simplified block diagram of an example approximate data bus inversion (DBI) system implemented in an MCPL.

Turning to FIG. 8, a simplified block diagram illustrates an example multi-chip package (MCP) device 800 including an MCP link (MCPL) 820 implemented with an approximate data bus inversion system. MCP device 800 and MCP link 820 may be configured in the same or similar manner as MCPs and MCPLs described herein (e.g., MCP device 500, MCPL 520, block diagram 600, etc.). In one or more examples, the MCPL 820 may be implemented using physical electrical connections (e.g., wires implemented as lanes of a bus/channel) connecting a first device 805 (e.g., a first die including one or more sub-components) to a second device 815 (e.g., a second die including one or more sub-components). In one example, device 805 may be an upstream device and device 810 may be a downstream device. In the particular example shown in the high-level representation of FIG. 8, signals in channels 822, 824 can be unidirectional and lanes can be provided for the data signals to have both an upstream and downstream data transfer. While FIG. 8 shows the first device 805 as the upstream component and the second device 810 as the downstream component, and physical lanes of the MCPL 820 used in sending data (from device 805) as a downstream channel 822 and lanes used for receiving data (from device 810) as an upstream channel 824, it should be appreciated that the MCPL between devices 805, 810 may be configured for use by each device to both send and receive data between the devices, and may be combined or separated in any suitable configuration.

In at least one embodiment, the approximate DBI system may be provisioned in or coupled to transmitter circuitry (830, 840) and receiver circuitry (836, 846) in the communicating devices (or dies), such as devices 805 and 810. In at least one implementation, transmitter circuitry 830 may be part of MCPL PHY layers (e.g., 630a, 625a) of the transmitting device 805, and receiver circuitry 846 may be part of MCPL layers (e.g., 630b, 625b) of the receiving device 810. In the example of MCP device 800, device 805 can include transmitter circuitry 830 and receiver circuitry 836, and device 810 can include complementary elements such as receiver circuitry 846 and transmitter circuitry 840. Transmitter circuitry 830 of device 805 can include transition identifier logic 831, approximate DBI logic 832, and DBI encoder 834, and receiver circuitry 836 of device 805 can include a DBI decoder 838. Transmitter circuitry 840 of device 810 can include transition identifier logic 841, approximate DBI logic 842, and DBI encoder 844, and receiver circuitry 846 of device 810 can include a DBI decoder 848. In one or more embodiments, transition identifier logic 831, approximate DBI logic 832, DBI encoder 834, and DBI decoder 838 may be provisioned as part of the MCPL logical PHY (e.g., 630a) such as in LLP logic (e.g., 660a) of device 805. Similarly, in device 810, transition identifier logic 841, approximate DBI logic 842, DBI encoder 844, and DBI decoder 848 may be provisioned as part of the MCPL logical PHY (e.g., 630b) such as in LLP logic (e.g., 660b) of device 810. It should be noted that the particular nonlimiting configuration shown in the FIGS., such as FIG. 8, are for illustrative purposes and may vary based on particular needs and implementations.

In at least one embodiment, the approximate DBI system involves the implementation of transition identifier logic (e.g., 831, 841) and approximate DBI logic (e.g., 832, 842) in cooperation with DBI encoders (e.g., 834, 844). For ease of reference, operations of transmitter circuitry in MCPL 820 may be described with reference to transmitter circuitry 830 and its components in upstream device 805, and operations of receiver circuitry in MCPL 820 may be described with reference to receiver circuitry 846 and its components in downstream device 810. It should be appreciated, however, that such operations may be performed by transmitter circuitry 840 in device 810 (when device 810 transmits data) and receiver circuitry 836 of device 805 (when device 805 receives the data).

In device 805, transition identifier logic 831 may evaluate bits of data to be transmitted in a new clock cycle via respective data lanes connecting device 805 to device 810. This data is also referred to herein as "original data" and/or "new data." Transition identifier logic 831 can compare bit values of the bits of the original data to respective bit values of data lanes in the previous clock cycle. The previous clock cycle may be the clock cycle immediately preceding the new clock cycle. A determination can be made with respect to each data lane as to whether the lane has a bit value associated with a previous clock cycle that is required to transition (i.e., switch, change) to a different bit value in order to transmit the original data (i.e., noninverted) in a new clock cycle. For each data lane and associated bit to be transmitted via the data lane, a respective transition input value can be generated. A transition input value generated for a given data lane indicates whether a transition is required on the given data lane based on the associated bit (in the original data) to be transmitted in the new clock cycle via the given data lane.

In one or more embodiments, the transition input values can be divided into two or more sets (or groups). In at least some embodiments, transition input values may be evenly divided such that each set contains the same number of transition input values, representing the same number of data lanes. For a given set of transition input values, a majority vote circuit determines whether a majority of the data lanes, represented by the given set of transition input values, have bit values that are required to transition in order to transmit the original data. An output value can be generated for the given set, where the output value represents whether a majority of the data lanes have bit values that are each required to transition to another value (e.g., 1 to 0 or 0 to 1) in order to transmit the original data. In one example, an output value of 1 indicates that a majority of the data lanes have bit values that are required to transition to another value in order to transmit the original data, while an output value of 0 indicates that less than a majority of the data lanes have bit values that are required to transition to other values in order to transmit the original data.

The output values from each majority vote decision circuit applied to a set of transition input values can be evaluated using OR logic to generate a DBI signal to assert or de-assert. The DBI signal can be provided to DBI encoder 834 to enable or not enable the DBI encoder to invert the original data. For example, if the output values represent that, for each set of transition input values, a majority of data lanes represented by the set of transition input values have bit values that are required to transition to other values in order to transmit the original data, then the output values may be used to generate a signal to assert DBI. The DBI signal can enable the DBI encoder 834 to invert the original data. Accordingly, DBI encoder 834 encodes the original data into an inverted form to be transmitted via the data lanes. Also, another data lane (also referred to herein as 'inversion indicator') may be asserted (e.g., set to 1) to indicate to the receiver circuitry 846 that the data received on the data lanes of the bus needs to be inverted to obtain the original data. Otherwise, if an output value of a single set of transition input values indicates that less than a majority of data lanes represented by that set of transition input values have bit values that are required to transition, then DBI is not asserted and DBI encoder 834 does not invert the original data for transmission. Thus, the data lanes are encoded with the original (i.e., noninverted) data for transmission to device 810. Also, the inversion indicator is de-asserted (e.g., set to 0) to indicate to the receiver circuitry 846 that the data received on the data lanes of the bus is not inverted and represents the original data.

In some embodiments, data bus inversion indicator may be set to 1 when asserted and set to 0 when de-asserted. In other embodiments, however, the data bus inversion indicator may be implemented in a different manner. For example, the data bus inversion indicator may be set to 0 when asserted and set to 1 when de-asserted. Moreover, any other type of signaling may be used to convey to the receiver whether or not particular data being sent to the receiver is inverted or not inverted. Additionally, in some implementations, an inversion indicator may be included in the calculation of the number of switching bits for a particular scenario. In this particular scenario, inversion is performed if half of the data lanes have bit values that would need to transition in the new clock cycle and if the inversion indicator was asserted in the previous clock cycle. In this case, the number of lanes with switching bits is a majority of the total number of lanes, where the total number of lanes includes data lanes for the original data bits to be transmitted in the new clock cycle and the extra lane for the inversion indicator bit. In this implementation, however, a calculation is made to determine that exactly half of the data lanes have bit values that need to transition in the new clock cycle.

When device 810 receives data via data lanes sent in the new clock cycle in channel 822, receiver circuitry 846 may first determine whether the received data is inverted. This can be determined by checking the data bus inversion indicator sent via channel 822. If the data bus inversion indicator is asserted (e.g., set to 1), the DBI decoder 848 can invert the bit values of the data lanes to obtain the original data. If the data bus inversion indicator is de-asserted (e.g., set to 0), the DBI decoder 848 does not invert the bit values of the data lanes and simply receives the bit values of the data lanes as the original data.

In one or more alternative embodiments of approximate DBI logic 832, instead of applying majority vote logic to transition input values, majority vote logic may be applied to sets of inputs to determine whether the majority of data bits to be transmitted are a particular logic level (e.g., 1 or 0). Bit values of the data bits to be transmitted can be divided into two or more sets. In at least some embodiments, bit values may be evenly divided such that each set contains the same number of bit values. For a given set of bit values, a majority vote circuit may determine whether a majority of the bits to be transmitted that are represented by the given set of bit values, have a certain value (e.g., 1). An output value can be generated for the given set, where the output value indicates whether a majority of the bit values in the set have the certain value. In one example, an output value of 1 indicates that a majority of the bit values in the set have the certain value (e.g., 1), while an output value of 0 indicates that less than a majority of the bit values in the set have the certain value. The output values from the majority vote circuits applied to the sets of bit values can be evaluated in the same or similar manner as the output values from the majority vote circuits applied to the sets of transition input values, as previously described herein. Additionally, DBI may be asserted or de-asserted also as described with reference to output values obtained based on sets of transition input values.

Figure 9:
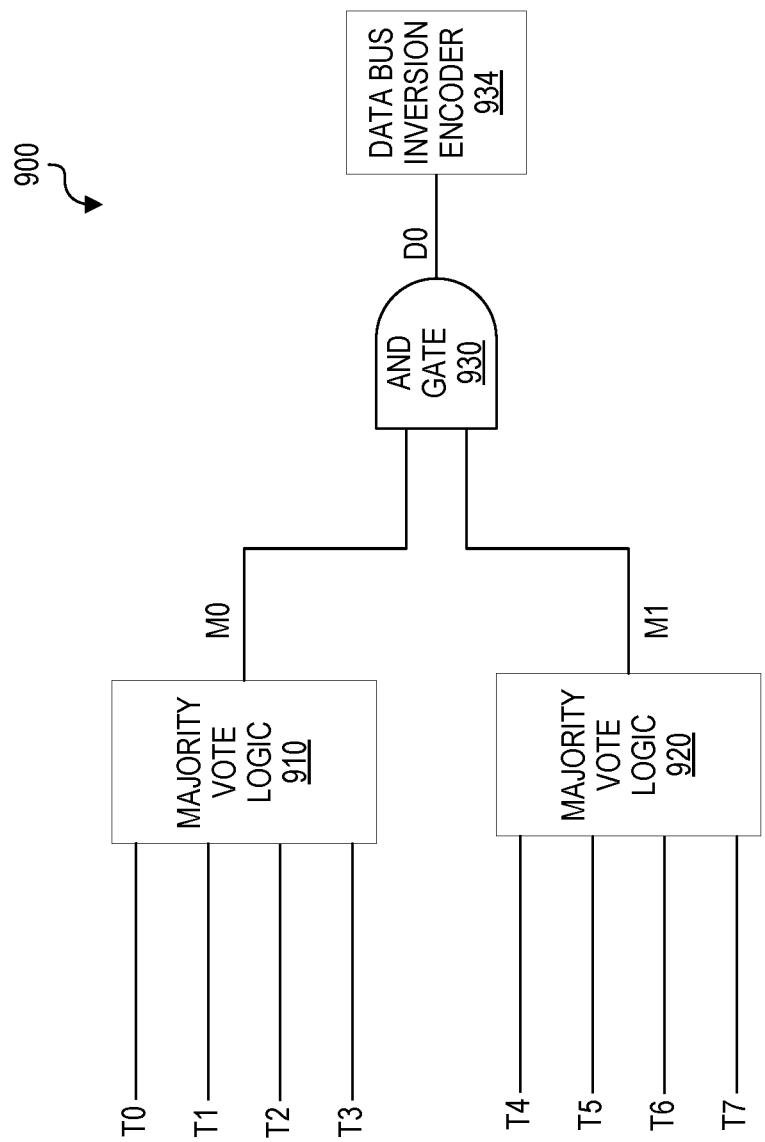
FIG. 9 is a simplified block diagram illustrating example logic of an approximate DBI system.

Turning to FIG. 9, FIG. 9 is a block diagram illustrating example logic 900 that may be used in one or more embodiments. Logic 900 represents one possible implementation of approximate DBI logic 832, 842 of MCPL 820 of MCP device 800. In this example, logic 900 is implemented for eight data lanes (e.g., L0-L7, not shown) per DBI. It should be apparent however, that logic 900 could be scaled to accommodate any number of data lanes.

New data (also referred to as "original data") to be transmitted in a new clock cycle over the eight data lanes L0-L7 includes eight bits (e.g., B0-B7, not shown). Bit values of the eight bits in the original data can be compared to bit values of the eight data lanes L0-L7, respectively, to determine if the respective bit values are the same or different. The bit values of the eight data lanes L0-L7 are associated with data transmitted during a previous clock cycle. Based on the comparison, eight transition input values T0-T7 may be generated, with each transition input value indicating whether the respective bit values being compared are the same or different. If respective bit values being compared are different, then a transition input value that is generated indicates that the bit value of the data lane is required to transition to a bit value of a bit to be transmitted via that data lane. If respective bit values being compared are the same, then a transition input value that is generated indicates that the bit value of the data lane is not required to transition to the bit value of the bit to be transmitted via that particular data lane. Thus, each transition input value indicates whether a bit value of one data lane from the previous clock cycle needs to transition to another value (e.g., transition from 1 to 0 or transition from 0 to 1) in order for the original data to be transmitted via the data lanes.

Generally, instead of calculating an actual sum of the number of switching lanes using the transition input values, approximate DBI logic (e.g. 900) implements two or more majority vote calculations to determine whether the bus needs inversion (e.g., to reduce SSO) or not. In the embodiment shown in FIG. 9, logic 900 implements two majority vote calculations as first majority vote logic 910 and second majority vote logic 920. The transition input values are divided into two equal sets of four transition input values (e.g., T0-T3 and T4-T7). A first set of transition input values T0-T3 is fed into first majority vote logic 910, and a second set of transition input values T4-T7 is fed into second majority vote logic 920. First majority vote logic 910 determines whether the first set of transition input values T0-T3 indicates that a majority of a first set of data lanes (L0-L3) have bit values from a previous clock cycle that are required to transition in order to transmit a first set of bits (e.g., B0-B3) of the original data via the first set of data lanes (L0-L3).

Output value M0 from majority vote logic 910 indicates whether or not the bit values of a majority of the first set of data lanes (e.g., L0-L3) are required to transition. In one example, M0 may be set to 1 if bit values of a majority of the first set of data lanes (e.g., L0-L3) are required to transition, and M0 may be set to 0 if bit values of less than a majority of the first set of data lanes (e.g., L0-L3) are required to transition.

Second majority vote logic 920 determines whether the second set of transition input values T4-T7 indicates that a majority of a second set of data lanes (L4-L7) have bit values from a previous clock cycle that are required to transition in order to transmit a second set of bits (e.g., B4-B7) of the original data via the second set of data lanes (L4-L7).

Output value M1 from majority vote logic 920 indicates whether or not the bit values of a majority of the second set of data lanes (e.g., L4-L7) are required to transition. In one example, M1 may be set to 1 if bit values of a majority of the second set of data lanes (e.g., L4-L7) are required to transition, and M1 may be set to 0 if bit values of less than a majority of the second set of data lanes (e.g., L4-L7) are required to transition.

Output values M0 and M1 may be fed into an AND gate 930, which applies AND logic to M0 and M1. Thus, if both M0 and M1 indicate that a majority of the bit values of the respective sets of data lanes in a previous clock cycle are required to transition to other values to transmit the original data in a new clock cycle, then the AND gate 930 produces a DBI output value DO (e.g., high value of 1) to assert DBI and cause DBI encoder 934 to encode the original data into an inverted version to be transmitted by the data lanes L0-L7. If at least one of M0 or M1 indicates that less than a majority (i.e., half or less) of the bit values of its respective sets of data lanes in a previous clock cycle are required to transition to other values to transmit the original data in a new clock cycle, then the AND gate 930 produces a DBI output value DO (e.g., low value of 0) to de-assert DBI and cause DBI encoder 934 to encode the original data (i.e., noninverted) to be transmitted by the data lanes L0-L7.

As described above, DBI can be asserted when both M0 and M1 indicate that a majority of the respective sets of data lanes require transitions from a previous clock cycle in order to transmit the original data in the new clock cycle. In one implementation described above, if both M0 and M1 are 1, then DBI may be asserted. This caps the switching possibility to 6 lanes. The probability of 6 lanes that require switching also causing DBI to be asserted may be reduced if M0 and M1 can both be asserted only if 3 out of 4 lanes in the respective majority vote inputs switch. In randomized data traffic, it is more likely that 3 out of 4 lanes will require switching rather than a concentrated set of lanes switching (e.g., 4 and 2 or 2 and 4). Thus, for random bits or scrambled traffic, 3 out of 4 required transitions for each subset is more likely to occur, and thus cause DBI to be asserted. Although this majority vote-based calculation is approximate, it limits the total lanes switching based on choice of lanes per majority vote. This gives the designer a tradeoff between maximum allowed switching and latency.

Figure 10:
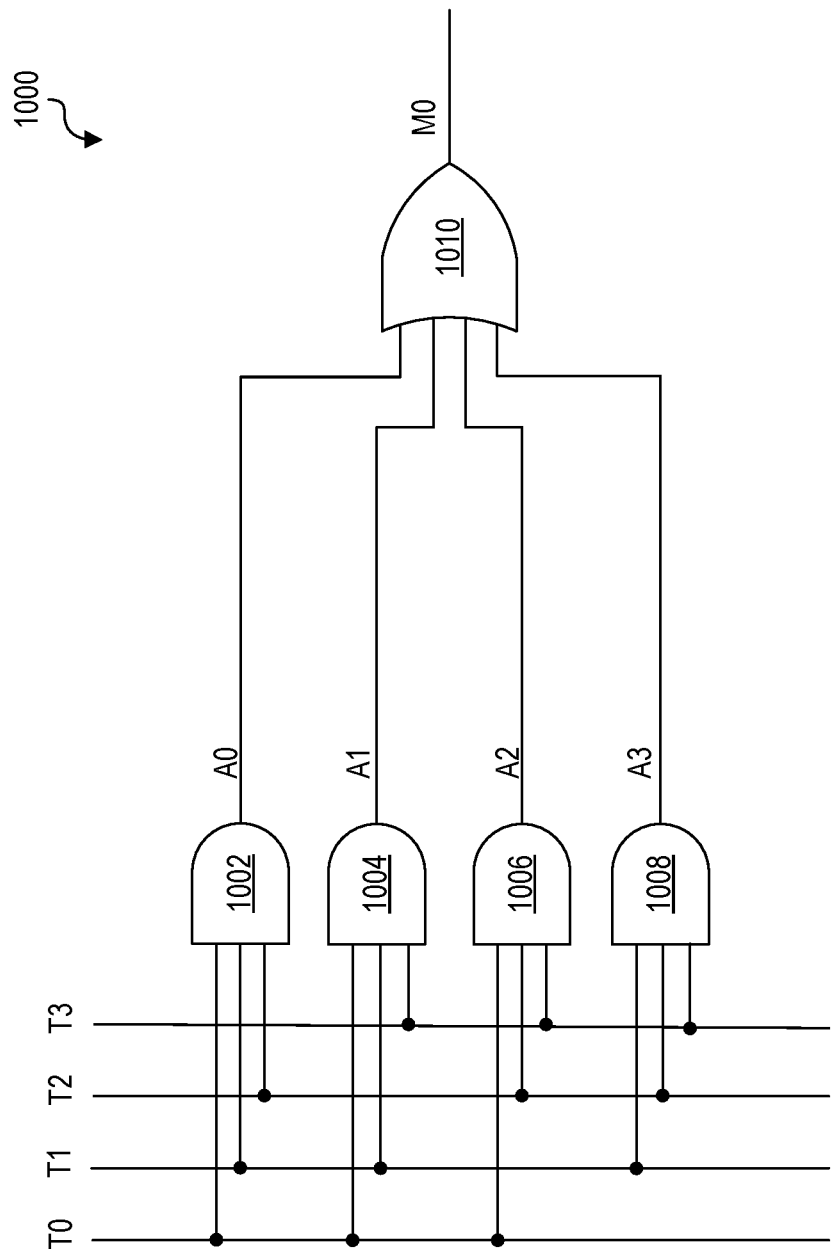
FIG. 10 is an example circuit diagram illustrating an example majority vote logic circuit.

Turning to FIG. 10, an example circuit diagram 1000 illustrates further details of majority vote logic, such as majority vote logic 910 and 920. Majority vote logic uses simple AND/OR logic gates from a selected number of inputs to produce an output indicating whether a majority of the inputs were is or not. In this example, circuit diagram 1000 includes four transition input values T0-T3, four AND gates 1002, 1004, 1006, and 1008, and an OR gate 1010. Each AND gate has a different combination of three inputs selected from transition input values T0-T3. Each combination may represent a different majority of transition input values. Thus, each combination can represent a different majority of data lanes having bit values that are required to transition from a previous clock cycle. For example, T0, T1, and T2 are inputs to AND gate 1002. If each of T0, T1, and T2 indicate that a respective bit value of a data lane is required to transition to another bit value, then the AND gate 1002 outputs a value A0 indicating that a majority of data lanes corresponding to transition input values T0, T1, and T2 have bit values that are required to transition. Similarly, T0, T1, and T3 are inputs to AND gate 1004, which outputs A1; T0, T2, and T3 are inputs to AND gate 1006, which outputs a value A2; and T1, T2, and T3 are inputs to AND gate 1008, which outputs a value A3. The output values A0-A4 are fed into OR gate 1010 to determine whether at least one combination of transition input values indicates a majority of data lanes corresponding to transition input values T0-T3 have bit values that are required to transition to transmit the original data. An output value M0 indicates whether DBI is asserted or de-asserted.

Other majority vote logic (e.g., 920) having four transition input values may be implemented in the same or similar manner as circuit diagram 1000. A larger number of transition value inputs may be used in a single majority vote circuit, but could require additional AND gates to accommodate the other possible combinations that result in a majority.

FIGS. 11-13B show simplified flowcharts illustrating example techniques associated with a system for performing an approximate majority vote based DBI technique for latency sensitive applications. In at least one embodiment, one or more operations correspond to activities of FIGS. 11-13B. A multi-chip package device (e.g., 500, 800) containing a processor (e.g., 525, 540) and transmitter circuitry (e.g., 830, 840), or a portion thereof, may utilize, perform, or cause the performance of at least some of the one or more operations. In at least some embodiments, transition identifier logic (e.g., 831, 841), approximate DBI logic (e.g., 832, 842), and/or DBI encoder (e.g., 834, 844), or a portion thereof may utilize, perform, or cause the performance of at least some of the one or more operations. Transmitters may comprise hardware, firmware, software, or any suitable combination thereof for performing at least some of the one or more of the operations.

Figure 11:
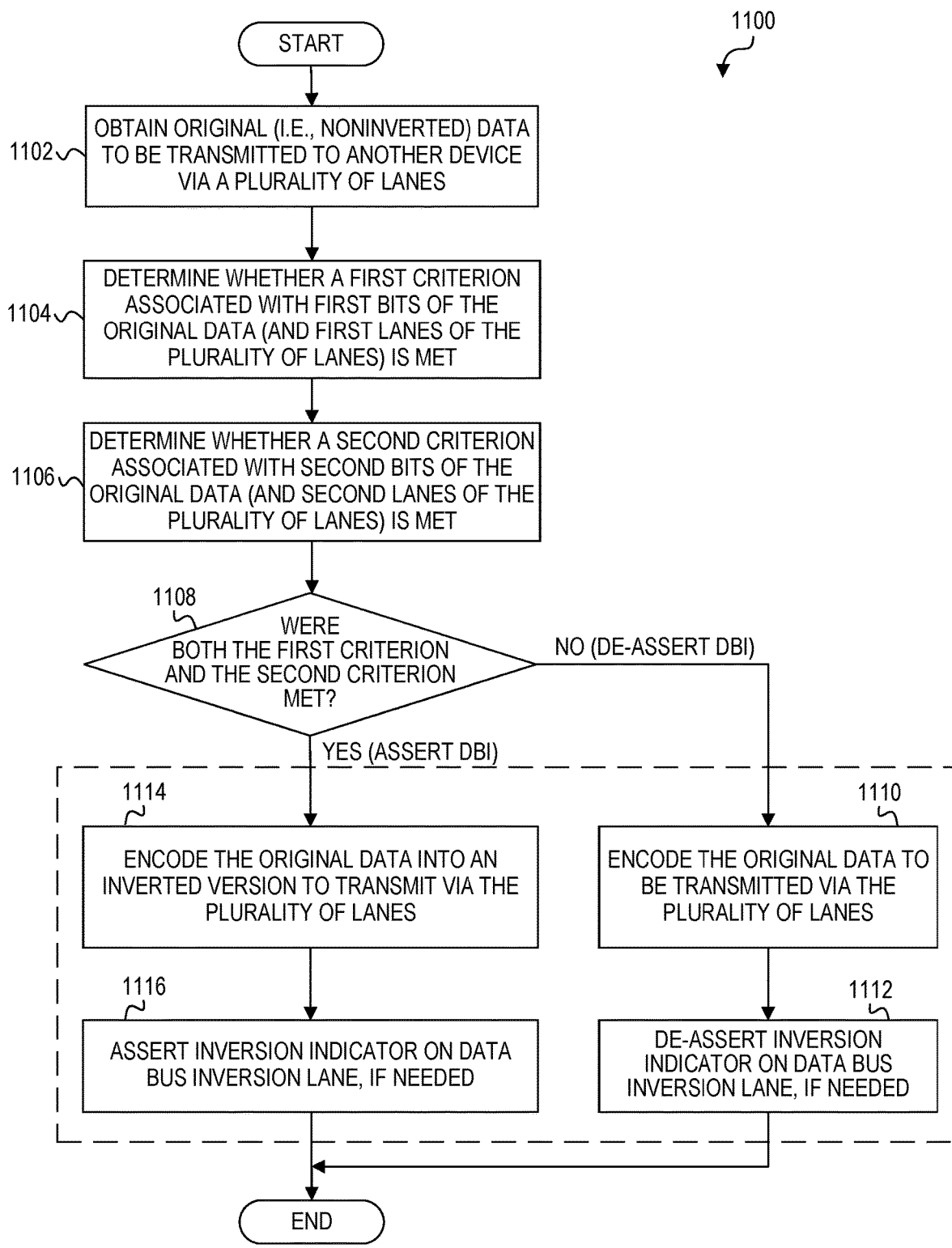
FIG. 11 is a simplified flow chart illustrating an example technique that may be associated with performing approximate data bus inversion.

FIG. 11 shows flowchart 1100 illustrating a general technique for performing an approximate majority vote based DBI technique in a system with a multi-chip package link (MCPL), as previously described herein. At 1102, original data may be generated, received, or otherwise obtained for transmission from a first device to a second device via a plurality of data lanes in an MCPL connecting the first device to the second device. The original data may comprise at least two sets of multiple bits (e.g., first bits and second bits).

At 1104, a determination is made as to whether a first criterion associated with the first bits of the original data and first lanes of the plurality of lanes is met, where the first bits are to be transmitted to the second device via the first lanes, respectively. At 1106, a determination is made as to whether a second criterion associated with the second bits of the original data and second lanes of the plurality of lanes is met, where the second bits are to be transmitted to the second device via the second lanes, respectively.

At 1108, a determination is made as to whether both the first criterion and the second criterion are met. If either the first criterion or the second criterion is not met, or if both the first criterion and the second criterion are not met, then at 1110, the original data is encoded to be transmitted via the plurality of lanes. Thus, the data lanes are to transmit the bit values, respectively, of the original data during the new clock cycle. In at least some embodiments, only previous bit values in the data lanes that are different than the bit values of the original data to be transmitted are transitioned (e.g., changed, inverted, etc.). The previous bit values in the data lanes that are the same as the bit values of the original data to be transmitted can remain the same value. At 1112, an inversion indicator can be de-asserted on a data bus inversion lane, if needed. In one example, the inversion indicator may be de-asserted by encoding a 0 value to be transmitted in the data bus inversion lane, to indicate to the receiving device that the data being transmitted on the plurality of data lanes is not inverted.

With reference again to 1108, if it is determined that both the first criterion and the second criterion are met, then at 1114, DBI is asserted and the original data is encoded into an inverted version to be transmitted via the plurality of lanes. Thus, the data lanes are to transmit the bit values, respectively, of the inverted version of the original data during the new clock cycle. In at least some embodiments, only previous bit values in the data lanes that are the same as the bit values of the original data to be transmitted are transitioned (e.g., changed, inverted, etc.). The previous bit values in the data lanes that are different than the bit values of the original data to be transmitted can remain the same value. At 1116, an inversion indicator is asserted on a data bus inversion lane, if needed. In one example, the inversion indicator may be asserted by encoding a 1 value to be transmitted in the data bus inversion lane, to indicate to the receiving device that the data being transmitted on the plurality of data lanes is inverted, and thus the data being transmitted will need to be inverted again to obtain the original data.

Figure 12A:
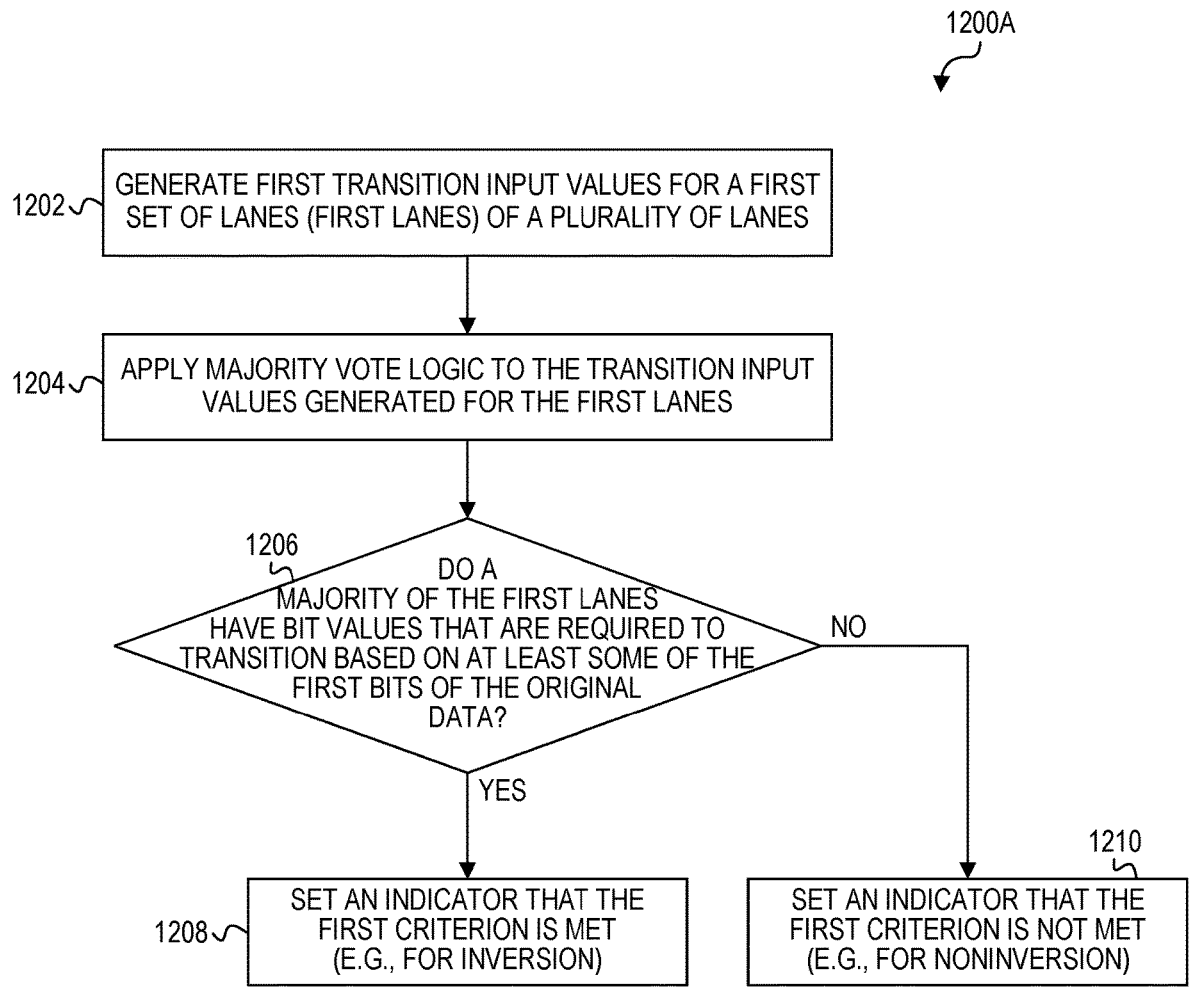
FIGS. 12A and 12B are simplified flow charts illustrating possible operations that may be associated with one embodiment of approximate data bus inversion.
Figure 12B:
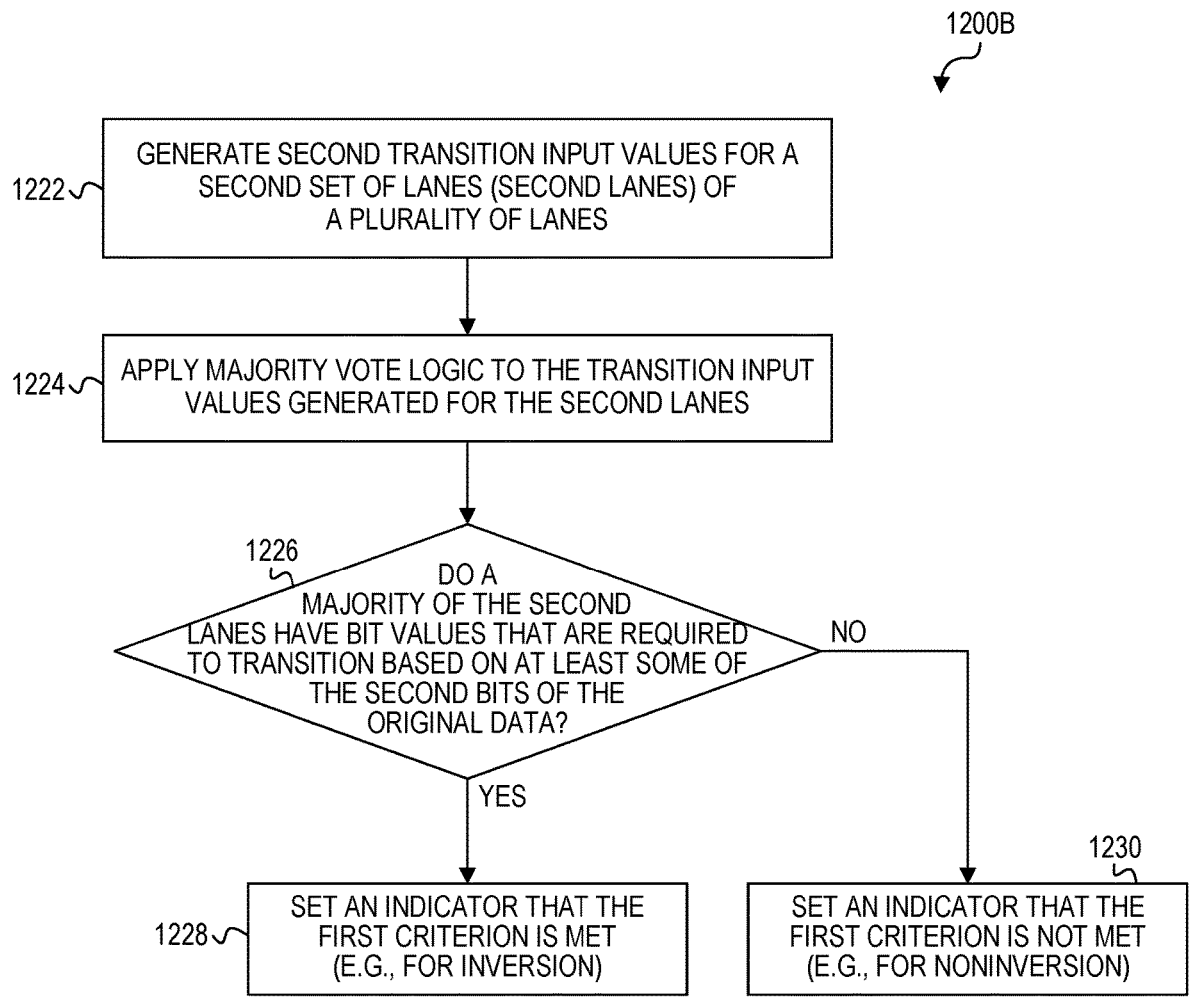

FIGS. 12A and 12B show simplified flowcharts that illustrate example operations associated with determining whether a first criterion or a second criterion is met (e.g., 1102, 1104 in FIG. 11) in one embodiment of an approximate majority vote based DBI technique. FIG. 12A shows simplified flowchart 1200A, which illustrates one or more operations for determining whether a first criterion is met in one embodiment of an approximate majority vote based DBI technique.

At 1202, first transition input values are generated for a first set of lanes (first lanes) of a plurality of lanes. For each lane of the first set of lanes, a transition input value is generated that indicates whether the lane has a bit value associated with a previous clock cycle that is required to transition to a bit value of a bit in the first set of bits of the original data to be transmitted in a new clock cycle.

At 1204, majority vote logic is applied to the first transition input values generated for the first lanes. At 1206, the majority vote logic determines whether the first transition input values indicate that a majority of the first lanes have bit values from data transmitted during the previous clock cycle that are required to transition based on at least some of the bits of the first set of bits in the original data to be transmitted during the new clock cycle. If it is determined that a majority of the first lanes have bit values that are required to transition, then the first criterion is met and, at 1208, a first indicator may be set to indicate that the first criterion is met. If it is determined that a majority of the first lanes do not have bit values that are required to transition, then the first criterion is not met and, at 1210, the first indicator may be set to indicate that the first criterion is not met.

FIG. 12B shows a simplified flowchart 1200B, which illustrates one possible technique for determining whether a second criterion is met in one embodiment of an approximate majority vote based DBI technique. At 1222, second transition input values are generated for a second set of lanes (second lanes) of a plurality of lanes. For each lane of the second set of lanes, a transition input value is generated that indicates whether the lane has a bit value associated with a previous clock cycle that is required to transition to a bit value of a bit in the second set of bits of the original data to be transmitted in a new clock cycle.

At 1224, majority vote logic is applied to the second transition input values generated for the second lanes. At 1226, the majority vote logic determines whether the second transition input values indicate that a majority of the second lanes have bit values from data transmitted during the previous clock cycle that are required to transition based on at least some of the bits of the second set of bits in the original data to be transmitted during the new clock cycle. If it is determined that a majority of the second lanes have bit values that are required to transition, then the second criterion is met and, at 1228, a second indicator may be set to indicate that the second criterion is met. If it is determined that a majority of the second lanes do not have bit values that are required to transition, then the second criterion is not met and, at 1230, the second indicator may be set to indicate that the second criterion is not met.

In at least one embodiment, the first indicator and the second indicator may be used at 1108 of FIG. 11. For example, the first indicator and the second indicator may be used as inputs to an AND gate to approximate whether a majority of data lanes have bit values that need to transition to other bit values to transmit the original data. It should be apparent that the concepts herein can be scaled. For example, for wider links (e.g., greater number of lanes in the plurality of lanes) to transmit more data, one or more additional sets of lanes may be provided in the plurality of lanes and may be used to transmit the larger data. In such implementations, the same calculations can be performed to determine whether one or more additional criteria are met. The resulting indicators that indicate whether the one or more additional criteria are met may also be use as inputs to the AND gate be included in the approximation.

Figure 13A:
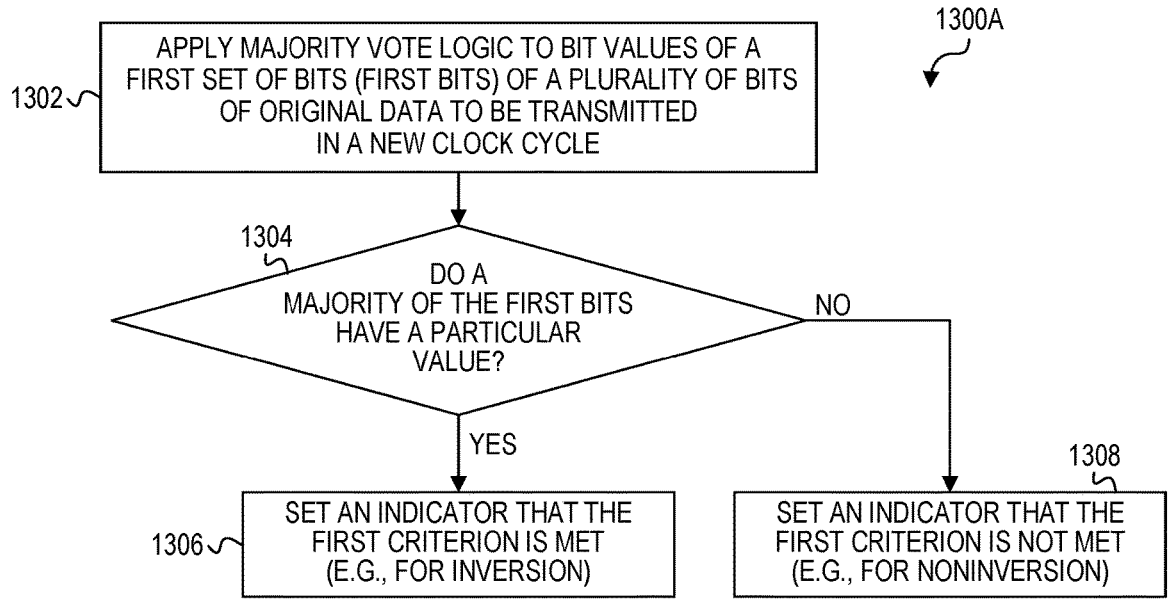
FIGS. 13A and 13B are simplified flow charts illustrating possible operations that may be associated with another embodiment of approximate data bus inversion.
Figure 13B:
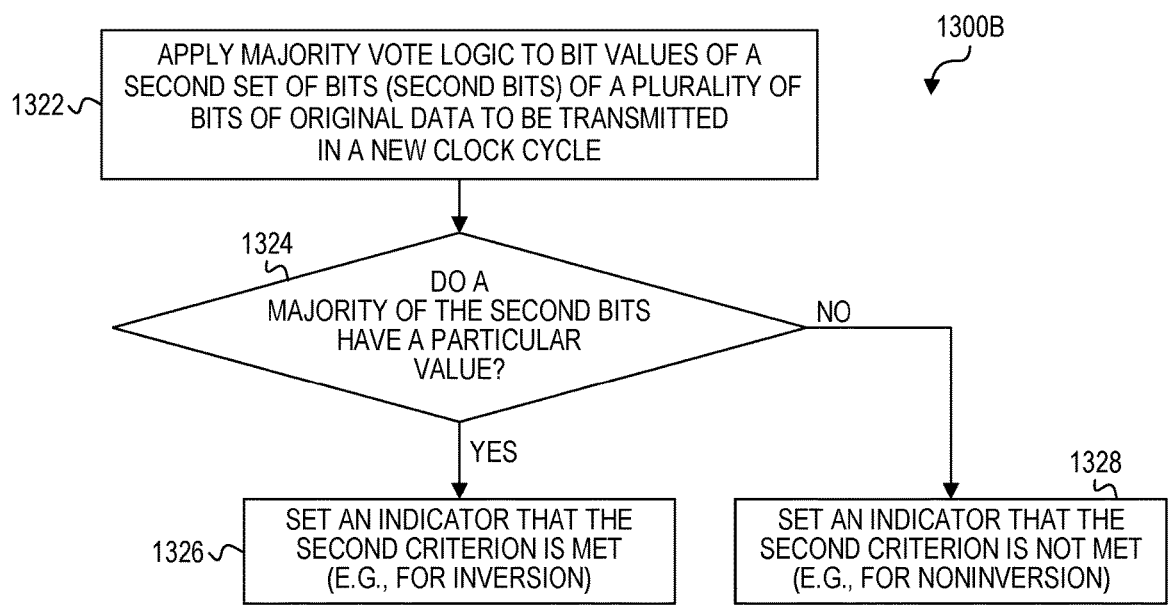

FIGS. 13A and 13B show simplified flowcharts that illustrate example operations associated with determining whether a first criterion or a second criterion is met (e.g., 1102, 1104 in FIG. 11) in another embodiment of an approximate majority vote based DBI technique. FIG. 13A shows simplified flowchart 1300A, which illustrates one or more operations for determining whether a first criterion is met in another embodiment of an approximate majority vote based DBI technique.

At 1302, majority vote logic is applied to a first set of bits (first bits) of a plurality of bits of original data to be transmitted in a new clock cycle. At 1304, the majority vote logic determines whether a majority of the first bits have a particular value (or level), such as binary 1 or binary 0. If it is determined that a majority of the first bits have the particular value, then the first criterion is met and, at 1306, a first indicator may be set to indicate that the first criterion is met. If it is determined that a majority of the first bits do not have the particular value, then the first criterion is not met and, at 1308, the first indicator may be set to indicate that the first criterion is not met.

FIG. 13B shows simplified flowchart 1300B, which illustrates one or more operations for determining whether a second criterion is met in the other embodiment of an approximate majority vote based DBI technique. At 1322, majority vote logic is applied to a second set of bits (second bits) of a plurality of bits of original data to be transmitted in a new clock cycle. At 1324, the majority vote logic determines whether a majority of the second bits have a particular value (or level), such as binary 1 or binary 0. If it is determined that a majority of the second bit have the particular value, then the second criterion is met and, at 1326, a second indicator may be set to indicate that the second criterion is met. If it is determined that a majority of the second bits do not have the particular value, then the second criterion is not met and, at 1328, the second indicator may be set to indicate that the second criterion is not met.

In at least one embodiment, the first indicator and the second indicator may be used at 1108 of FIG. 11. For example, the first indicator and the second indicator may be used as inputs to an AND gate to approximate whether a majority of bits of the original data have a particular value (or level). It should be apparent that the concepts herein can be scaled. For example, for wider links (e.g., greater number of lanes in the plurality of lanes) to transmit more data, one or more additional sets of lanes may be provided in the plurality of lanes and may be used to transmit the larger data. In such implementations, the same calculations can be performed to determine whether one or more additional criteria are met. The resulting indicators that indicate whether the one or more additional criteria are met may also be use as inputs to the AND gate be included in the approximation.

Figure 14:
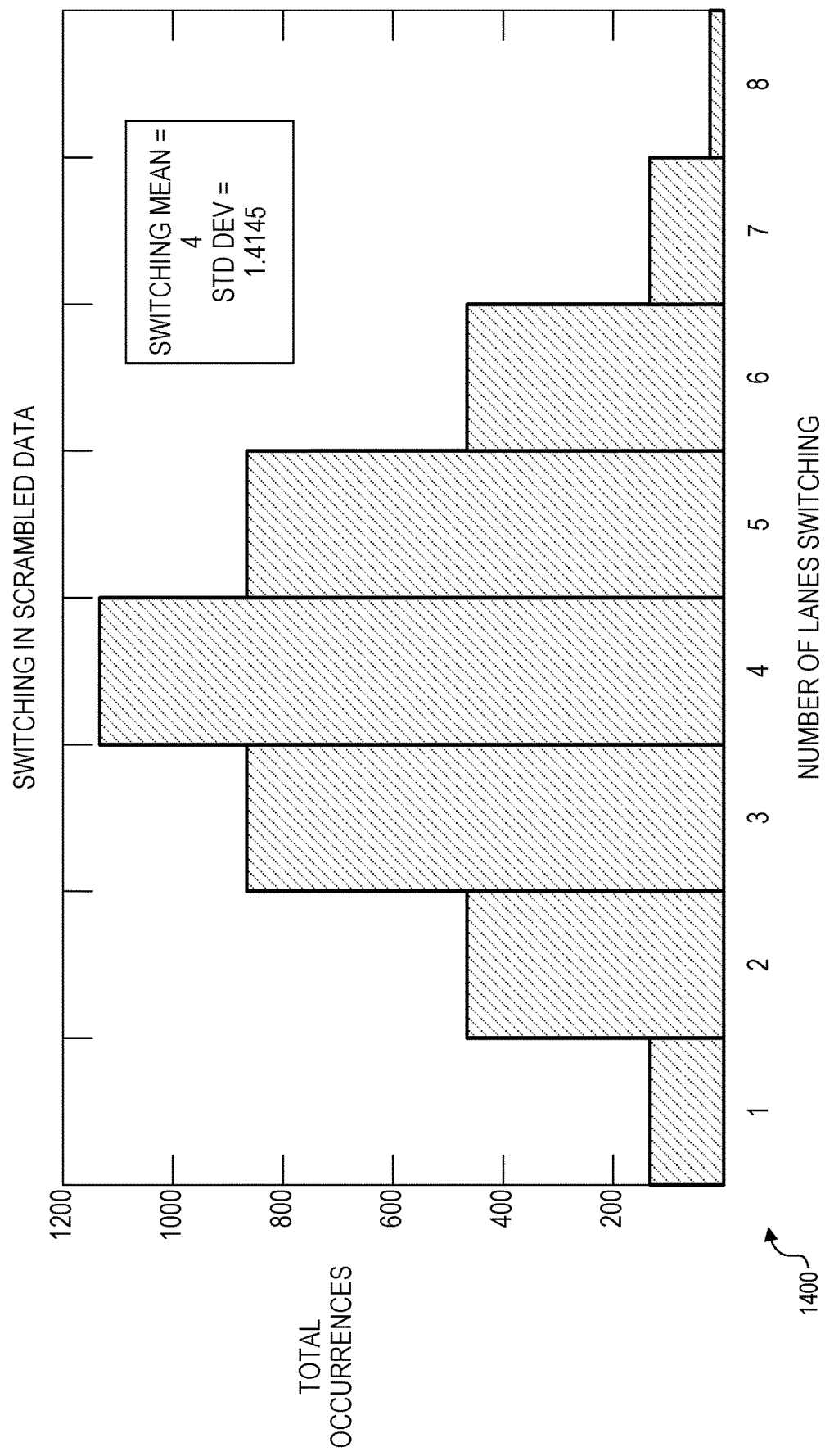
FIG. 14 is a bar graph illustrating switching statistics of an example system transmitting random data without using data bus inversion (DBI).

FIG. 14 is a bar graph 1400 illustrating switching statistics of an example system that transmitted random data without using data bus inversion (DBI). In this example scenario without DBI, the switching mean is equal to 4, and the standard deviation is equal to 1.4145. Without DBI, a significant number of transmissions require bit transitions in more than four lanes. Data transmissions that require bit transitions in more than half of the total lanes of a link (e.g., 5-8 lanes in FIG. 14), can produce a large amount of simultaneous switching output (SSO) noise. Thus, the distribution of data transmissions across lanes as shown in FIG. 14 illustrates that systems without DBI experience a significant amount of SSO noise.

Figure 15:
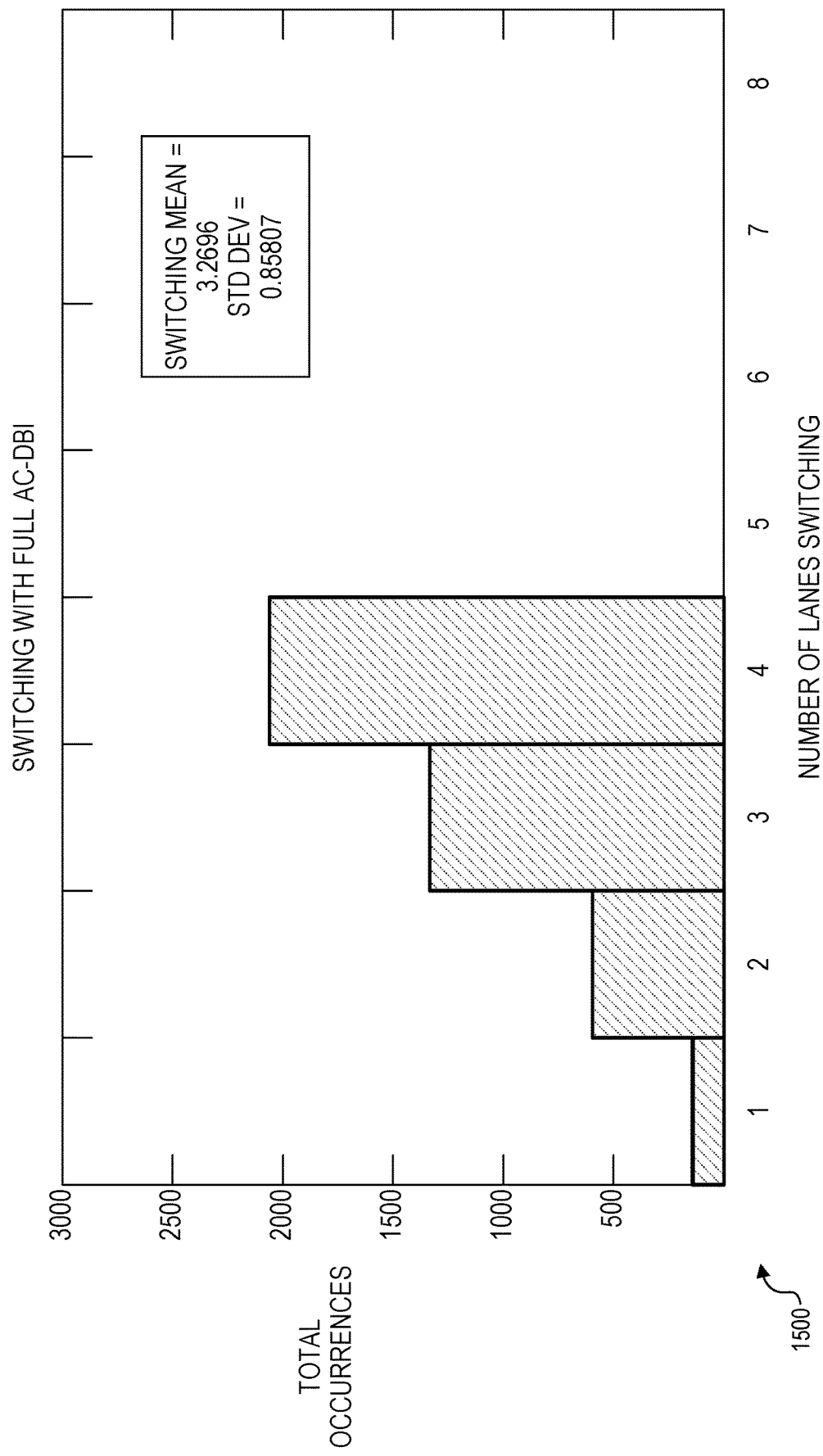
FIG. 15 is a bar graph illustrating switching statistics of an example system transmitting random data using traditional alternating current DBI (AC-DBI).

FIG. 15 is a bar graph 1500 illustrating switching statistics of an example system that transmitted random data using traditional alternating current DBI (AC-DBI). In this example scenario with full AC-DBI, the switching mean is equal to 3.2696, and the standard deviation is equal to 0.85807. As shown in bar graph 1500, the use of traditional DBI caps bit transitions at four lanes with an accurate count. Thus, the distribution of data transmissions across lanes as shown in FIG. 15 illustrates that systems with traditional DBI can prevent a significant amount of SSO noise. With traditional DBI however, full adders used to perform an accurate count to cap bit transitions at four lanes can introduce latency that may be unacceptable in latency-sensitive applications and others.

Figure 16:
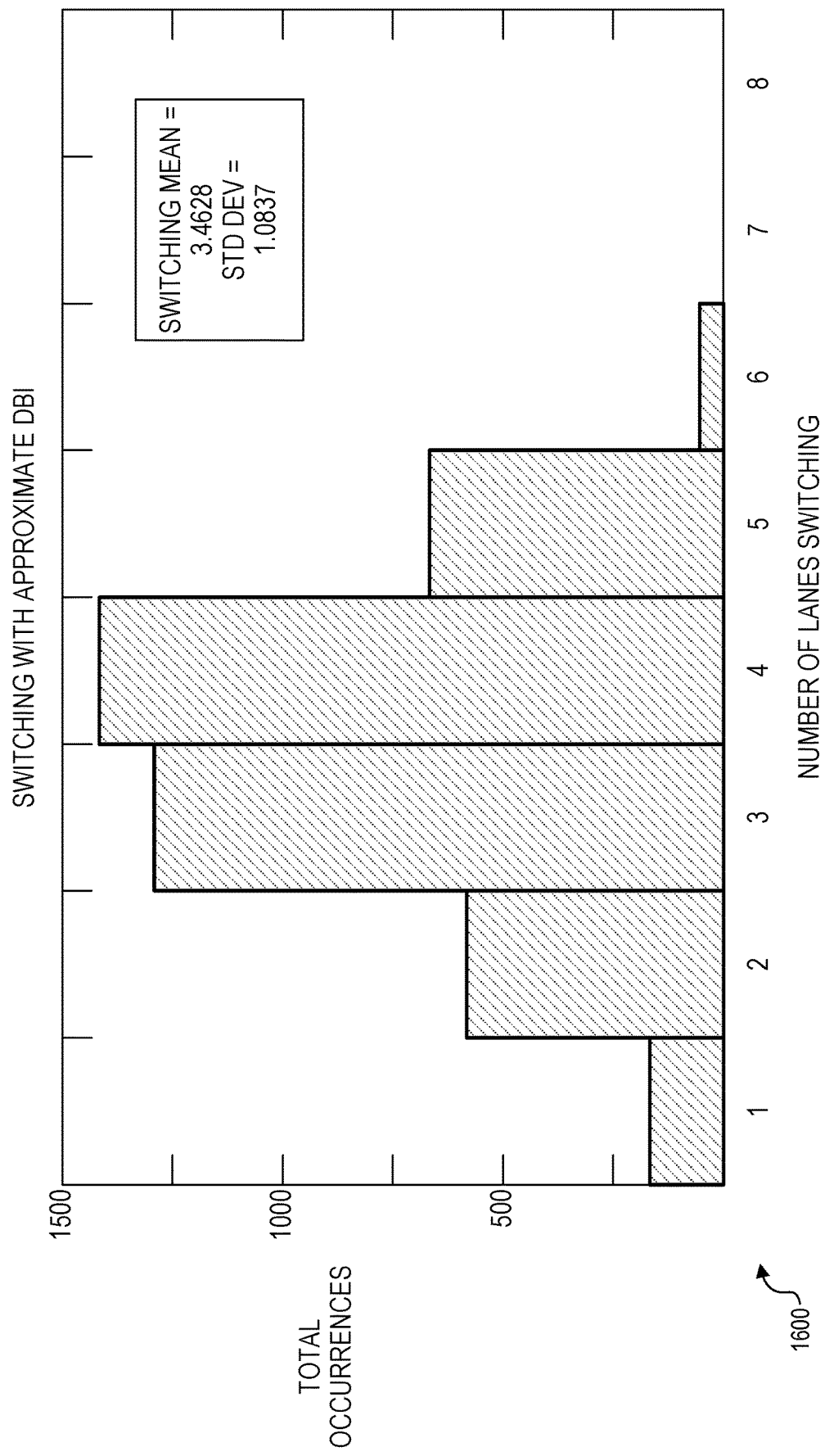
FIG. 16 is a bar graph illustrating switching statistics of an example system transmitting random data using approximate data bus inversion.

FIG. 16 is a bar graph 1600 illustrating switching statistics of an example system that transmitted random data using an approximate majority vote based data bus inversion technique. This majority vote based DBI has a maximum of 6 out of 8 lanes switching, but with much less probability than a system without DBI (e.g., in FIG. 4). Switching does not occur in the highest number of lanes (e.g., lanes 7 and 8 in this scenario). Although more switching is performed at 5 lanes than when traditional DBI is used, the speed and power and latency tradeoff can be advantageous and even critical for latency-sensitive applications.

FIG. 17 is a spreadsheet 1700 of switching statistics comparing results of various scenarios using different parameters in systems without using DBI, systems using full AC-DBI, and systems using approximate majority vote based DBI. The impact is considered in power delivery droop and noise simulations to ensure the desired specifications are met. Thus, for any number of lanes in a channel, adjustments can be made to the number of groups to which majority vote logic is applied. Based on the number of groups selected, the number of lanes in each group can change. For example, for a device with a link having 16 lanes, approximate majority vote based DBI could be configured to apply majority vote logic to 4 different groups of 4 lanes each. Alternatively, approximate majority vote based DBI could be configured to apply majority vote logic to 2 different groups of 8 lanes each. In the configuration with 2 groups of 8 lanes each, the switching mean for majority vote based DBI (7.0064) is closer to the switching mean for traditional DBI (i.e., 6.8225) than using 4 groups of 4 lanes each. Thus, using 2 groups of 8 lanes each can reduce more SSO noise than the other option.

Note that the apparatuses, methods, and systems described above may be implemented in any electronic device or system as aforementioned. As specific illustrations, the figures below provide exemplary systems for utilizing the embodiments as described herein. As the systems below are described in more detail, a number of different interconnects are disclosed, described, and revisited from the discussion above. And as is readily apparent, the advances described above may be applied to any of those interconnects, fabrics, or architectures. For instance, first and second devices (or dies) (e.g., 505, 510, 605, 610, 805, 810), may be implemented, which are equipped with functionality to implement an approximate majority vote based DBI technique as discussed in the examples above, in any one of a variety of computing architectures (e.g., using any one of a variety of different interconnects or fabrics). For instance, the devices may communicate within a personal computing system (e.g., implemented in a laptop, desktop, mobile, smartphone, Internet of Things (IoT) device, smart appliance, gaming console, media console, etc.). In another example, the devices may communicate within a server computing system (e.g., a rack server, blade server, tower server, rack scale server architecture or other disaggregated server architecture), among other examples.

Figure 18:
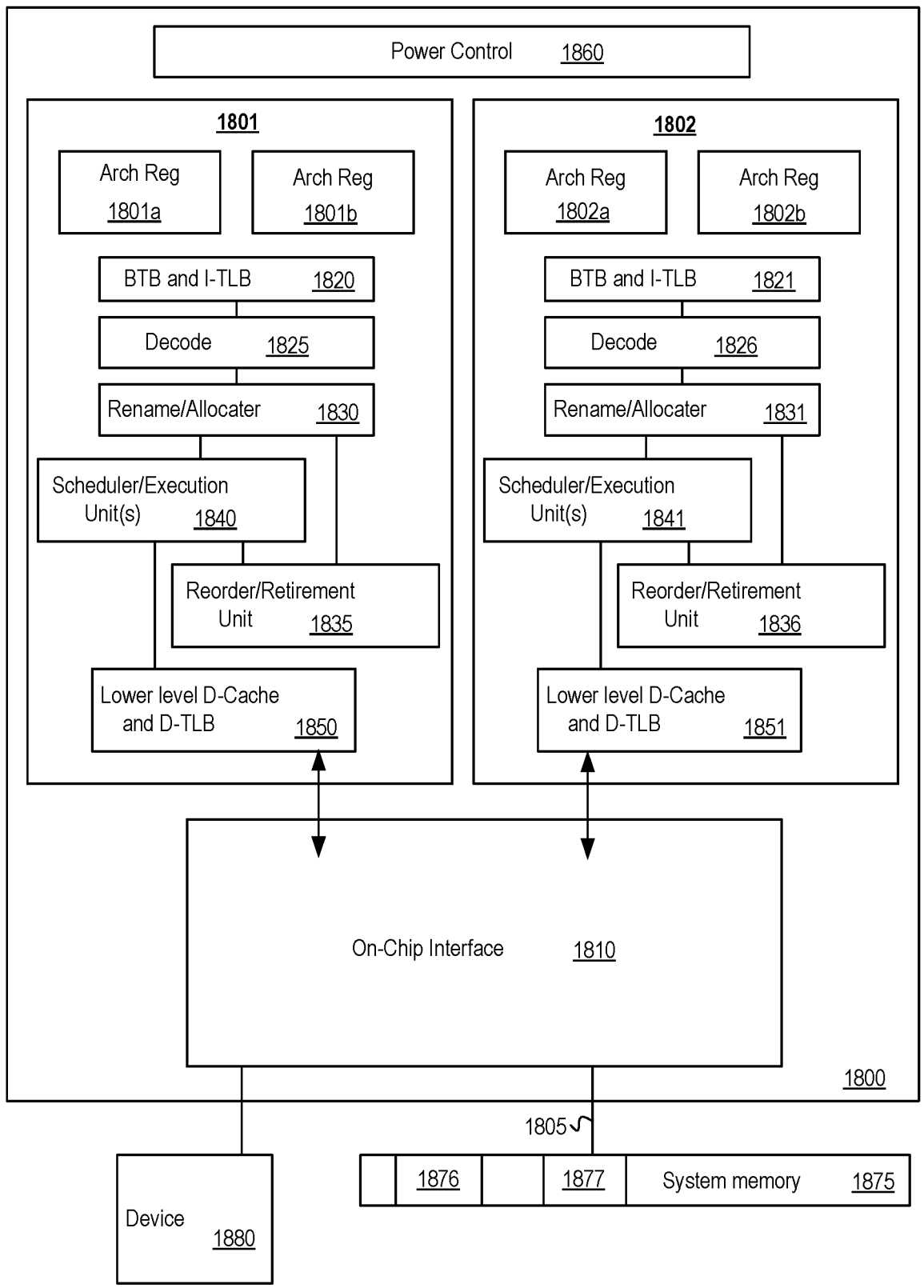
FIG. 18 illustrates a block diagram of an embodiment of a computing system including a multicore processor.

Referring to FIG. 18, an embodiment of a block diagram for a computing system including a multicore processor is depicted. Processor 1800 includes any processor or processing device, such as a microprocessor, an embedded processor, a digital signal processor (DSP), a network processor, a handheld processor, an application processor, a co-processor, a system on a chip (SOC), or other device to execute code. Processor 1800, in one embodiment, includes at least two cores—core 1801 and 1802, which may include asymmetric cores or symmetric cores (the illustrated embodiment). However, processor 1800 may include any number of processing elements that may be symmetric or asymmetric.

In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor (or processor socket) typically refers to an integrated circuit, which potentially includes any number of other processing elements, such as cores or hardware threads.

A core often refers to logic located on an integrated circuit capable of maintaining an independent architectural state, wherein each independently maintained architectural state is associated with at least some dedicated execution resources. In contrast to cores, a hardware thread typically refers to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

Physical processor 1800, as illustrated in FIG. 18, includes two cores—core 1801 and 1802. Here, core 1801 and 1802 are considered symmetric cores, i.e. cores with the same configurations, functional units, and/or logic. In another embodiment, core 1801 includes an out-of-order processor core, while core 1802 includes an in-order processor core. However, cores 1801 and 1802 may be individually selected from any type of core, such as a native core, a software managed core, a core adapted to execute a native Instruction Set Architecture (ISA), a core adapted to execute a translated Instruction Set Architecture (ISA), a co-designed core, or other known core. In a heterogeneous core environment (i.e. asymmetric cores), some form of translation, such a binary translation, may be utilized to schedule or execute code on one or both cores. Yet to further the discussion, the functional units illustrated in core 1801 are described in further detail below, as the units in core 1802 operate in a similar manner in the depicted embodiment.

As depicted, core 1801 includes two hardware threads 1801*a* and 1801*b*, which may also be referred to as hardware thread slots 1801*a* and 1801*b*. Therefore, software entities, such as an operating system, in one embodiment potentially view processor 1800 as four separate processors, i.e., four logical processors or processing elements capable of executing four software threads concurrently. As alluded to above, a first thread is associated with architecture state registers 1801*a*, a second thread is associated with architecture state registers 1801*b*, a third thread may be associated with architecture state registers 1802*a*, and a fourth thread may be associated with architecture state registers 1802*b*. Here, each of the architecture state registers (1801*a*, 1801*b*, 1802*a*, and 1802*b*) may be referred to as processing elements, logical processors, thread slots, or thread units, as described above. As illustrated, architecture state registers 1801*a* are replicated in architecture state registers 1801*b*, so individual architecture states/contexts are capable of being stored for logical processor 1801*a* and logical processor 1801*b*. In core 1801, other smaller resources, such as instruction pointers and renaming logic in allocator and renamer block 1830 may also be replicated for threads 1801*a* and 1801*b*. Some resources, such as re-order buffers in reorder/retirement unit 1835, I-TLB 1820, load/store buffers, and queues may be shared through partitioning. Other resources, such as general purpose internal registers, page-table base register(s), low-level data-cache and data-TLB 1815, execution unit(s) 1840, and portions of out-of-order unit 1835 are potentially fully shared.

Processor 1800 often includes other resources, which may be fully shared, shared through partitioning, or dedicated by/to processing elements. In FIG. 18, an embodiment of a purely exemplary processor with illustrative logical units/resources of a processor is illustrated. Note that a processor may include, or omit, any of these functional units, as well as include any other known functional units, logic, or firmware not depicted. As illustrated, core 1801 includes a simplified, representative out-of-order (OOO) processor core. But an in-order processor may be utilized in different embodiments. The OOO core includes a branch target buffer 1820 to predict branches to be executed/taken and an instruction-translation buffer (I-TLB) 1820 to store address translation entries for instructions.

Core 1801 further includes decode module 1825 coupled to fetch unit (e.g., BTB 1820) to decode fetched elements. Fetch logic, in one embodiment, includes individual sequencers associated with thread slots 1801*a*, 1801*b*, respectively. Usually core 1801 is associated with a first ISA, which defines/specifies instructions executable on processor 1800. Often machine code instructions that are part of the first ISA include a portion of the instruction (referred to as an opcode), which references/specifies an instruction or operation to be performed. Decode logic 1825 includes circuitry that recognizes these instructions from their opcodes and passes the decoded instructions on in the pipeline for processing as defined by the first ISA. For example, as discussed in more detail below decoders 1825, in one embodiment, include logic designed or adapted to recognize specific instructions, such as transactional instruction. As a result of the recognition by decoders 1825, the architecture or core 1801 takes specific, predefined actions to perform tasks associated with the appropriate instruction. It is important to note that any of the tasks, blocks, operations, and methods described herein may be performed in response to a single or multiple instructions; some of which may be new or old instructions. Note decoders 1826, in one embodiment, recognize the same ISA (or a subset thereof). Alternatively, in a heterogeneous core environment, decoders 1826 recognize a second ISA (either a subset of the first ISA or a distinct ISA).

In one example, allocator and renamer block 1830 includes an allocator to reserve resources, such as register files to store instruction processing results. However, threads 1801a and 1801b are potentially capable of out-of-order execution, where allocator and renamer block 1830 also reserves other resources, such as reorder buffers to track instruction results. Renamer unit 1830 may also include a register renamer to rename program/instruction reference registers to other registers internal to processor 1800. Reorder/retirement unit 1835 includes components, such as the reorder buffers mentioned above, load buffers, and store buffers, to support out-of-order execution and later in-order retirement of instructions executed out-of-order.

Scheduler and execution unit(s) block 1840, in one embodiment, includes a scheduler unit to schedule instructions/operation on execution units. For example, a floating point instruction is scheduled on a port of an execution unit that has an available floating point execution unit. Register files associated with the execution units are also included to store information instruction processing results. Exemplary execution units include a floating point execution unit, an integer execution unit, a jump execution unit, a load execution unit, a store execution unit, and other known execution units.

Lower level data cache and data translation buffer (D-TLB) 1850 are coupled to execution unit(s) 1840. The data cache is to store recently used/operated on elements, such as data operands, which are potentially held in memory coherency states. The D-TLB is to store recent virtual/linear to physical address translations. As a specific example, a processor may include a page table structure to break physical memory into a plurality of virtual pages.

Here, cores 1801 and 1802 share access to higher-level or further-out cache, such as a second level cache associated with on-chip interface 1810. Note that higher-level or further-out refers to cache levels increasing or getting further away from the execution unit(s). In one embodiment, higher-level cache is a last-level data cache—last cache in the memory hierarchy on processor 1800—such as a second or third level data cache. However, higher level cache is not so limited, as it may be associated with or include an instruction cache. A trace cache—a type of instruction cache—instead may be coupled after decoder 1825 to store recently decoded traces. Here, an instruction potentially refers to a macro-instruction (i.e. a general instruction recognized by the decoders), which may decode into a number of micro-instructions (micro-operations).

In the depicted configuration, processor 1800 also includes on-chip interface module 1810. Historically, a memory controller, which is described in more detail below, has been included in a computing system external to processor 1800. In this scenario, on-chip interface 1810 is to communicate with devices external to processor 1800, such as system memory 1875, a chipset (often including a memory controller hub to connect to memory 1875 and an I/O controller hub to connect peripheral devices), a memory controller hub, a northbridge, or other integrated circuit. And in this scenario, bus 1805 may include any known interconnect, such as multi-drop bus, a point-to-point interconnect, a serial interconnect, a parallel bus, a coherent (e.g. cache coherent) bus, a layered protocol architecture, a differential bus, and a GTL bus.

Memory 1875 may be dedicated to processor 1800 or shared with other devices in a system. Common examples of types of memory 1875 include DRAM, SRAM, non-volatile memory (NV memory), and other known storage devices. Note that device 1880 may include a graphic accelerator, processor or card coupled to a memory controller hub, data storage coupled to an I/O controller hub, a wireless transceiver, a flash device, an audio controller, a network controller, or other known device.

Recently however, as more logic and devices are being integrated on a single die, such as SOC, each of these devices may be incorporated on processor 1800. For example, in one embodiment, a memory controller hub is on the same package and/or die with processor 1800. Here, a portion of the core (an on-core portion) 1810 includes one or more controller(s) for interfacing with other devices such as memory 1875 or a graphics device 1880. The configuration including an interconnect and controllers for interfacing with such devices is often referred to as an on-core (or un-core configuration). As an example, on-chip interface 1810 includes a ring interconnect for on-chip communication and a high-speed serial point-to-point link (or bus) 1805 for off-chip communication. Yet, in the SOC environment, even more devices, such as the network interface, co-processors, memory 1875, graphics processor 1880, and any other known computer devices/interface may be integrated on a single die or integrated circuit to provide small form factor with high functionality and low power consumption.

In one embodiment, processor 1800 is capable of executing a compiler, optimization, and/or translator code 1877 to compile, translate, and/or optimize application code 1876 to support the apparatus and methods described herein or to interface therewith. A compiler often includes a program or set of programs to translate source text/code into target text/code. Usually, compilation of program/application code with a compiler is done in multiple phases and passes to transform hi-level programming language code into low-level machine or assembly language code. Yet, single pass compilers may still be utilized for simple compilation. A compiler may utilize any known compilation techniques and perform any known compiler operations, such as lexical analysis, preprocessing, parsing, semantic analysis, code generation, code transformation, and code optimization.

Larger compilers often include multiple phases, but most often these phases are included within two general phases: (1) a front-end, i.e. generally where syntactic processing, semantic processing, and some transformation/optimization may take place, and (2) a back-end, i.e. generally where analysis, transformations, optimizations, and code generation takes place. Some compilers refer to a middle, which illustrates the blurring of delineation between a front-end and back end of a compiler. As a result, reference to insertion, association, generation, or other operation of a compiler may take place in any of the aforementioned phases or passes, as well as any other known phases or passes of a compiler. As an illustrative example, a compiler potentially inserts operations, calls, functions, etc. in one or more phases of compilation, such as insertion of calls/operations in a front-end phase of compilation and then transformation of the calls/operations into lower-level code during a transformation phase. Note that during dynamic compilation, compiler code or dynamic optimization code may insert such operations/calls, as well as optimize the code for execution during runtime. As a specific illustrative example, binary code (already compiled code) may be dynamically optimized during runtime. Here, the program code may include the dynamic optimization code, the binary code, or a combination thereof.

Similar to a compiler, a translator, such as a binary translator, translates code either statically or dynamically to optimize and/or translate code. Therefore, reference to execution of code, application code, program code, or other software environment may refer to: (1) execution of a compiler program(s), optimization code optimizer, or translator either dynamically or statically, to compile program code, to maintain software structures, to perform other operations, to optimize code, or to translate code; (2) execution of main program code including operations/calls, such as application code that has been optimized/compiled; (3) execution of other program code, such as libraries, associated with the main program code to maintain software structures, to perform other software related operations, or to optimize code; or (4) a combination thereof.

Figure 19:
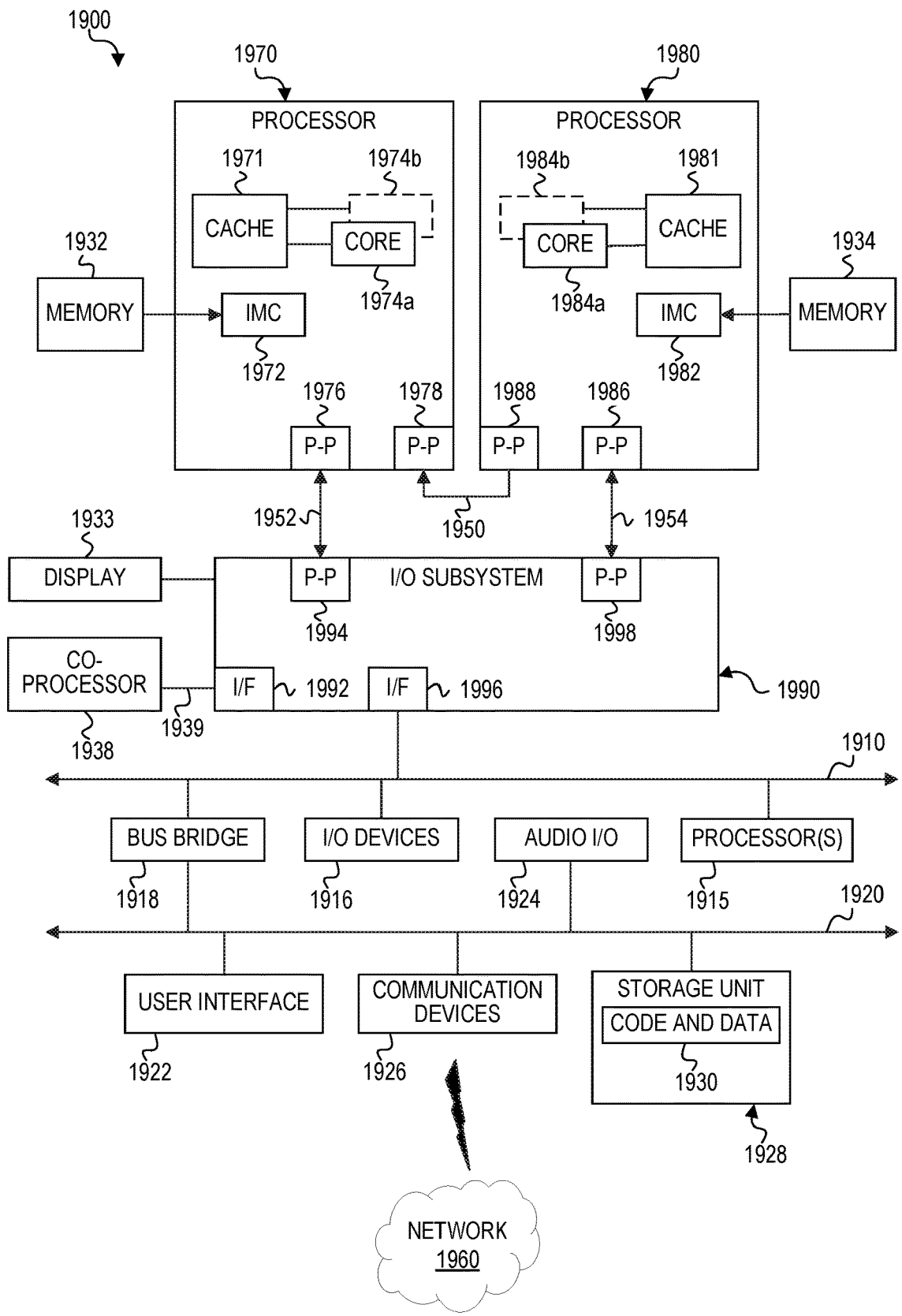
FIG. 19 illustrates a block of an embodiment of a computing system including multiple processors.

Referring now to FIG. 19, FIG. 19 illustrates a block diagram of another system 1900 that is arranged in a point-to-point (PtP) interconnect system. In particular, FIG. 19 shows a system where processors, memory, and input/output devices are interconnected by a number of point-to-point interfaces. Generally, system 1900 may utility one or more of the devices (or dies) implemented with an approximate majority vote based DBI system as previously described herein.

As shown in FIG. 19, system 1900 includes processors 1970 and 1980, which may be implemented as single core processors 1974a and 1984a or multi-core processors 1974a-1974b and 1984a-1984b. Processors 1970 and 1980 may each include a cache 1971 and 1981 used by their respective core or cores. A shared cache (not shown) may be included in either processors or outside of both processors, yet connected with the processors via P-P interconnect, such that either or both processors' local cache information may be stored in the shared cache if a processor is placed into a low power mode.

Processors 1970 and 1980 may also each include integrated memory controller logic (MC) 1972 and 1982 to communicate with memory elements 1932 and 1934, which may be portions of main memory locally attached to the respective processors. In alternative embodiments, memory controller logic 1972 and 1982 may be discrete logic separate from processors 1970 and 1980. Memory elements 1932 and/or 1934 may store various data to be used by processors 1970 and 1980 in achieving operations and functionality outlined herein.

Processors 1970 and 1980 may be any type of processor, such as those discussed in connection with other FIGURES. Processors 1970 and 1980 may exchange data via a point-to-point (PtP) interface 1950 using point-to-point interface circuits 1978 and 1988, respectively. Processors 1970 and 1980 may each exchange data with an input/output (I/O) subsystem 1990 via individual point-to-point interfaces 1952 and 1954 using point-to-point interface circuits 1976, 1986, 1994, and 1998. I/O subsystem 1990 may also exchange data with a high-performance graphics circuit 1938 via a high-performance graphics interface 1939, using an interface circuit 1992, which could be a PtP interface circuit. In one embodiment, the high-performance graphics circuit 1938 is a special-purpose processor, such as, for example, a high-throughput MIC processor, a network or communication processor, compression engine, graphics processor, GPGPU, embedded processor, or the like. I/O subsystem 1990 may also communicate with a display 1933 for displaying data that is viewable by a human user. In alternative embodiments, any or all of the PtP links illustrated in FIG. 19 could be implemented as a multi-drop bus rather than a PtP link.

I/O subsystem 1990 may be in communication with a bus 1910 via an interface circuit 1996. Bus 1910 may have one or more devices that communicate over it, such as a bus bridge 1918 and I/O devices 1916. Via a bus 1920, bus bridge 1918 may be in communication with other devices such as a user interface 1912 (such as a keyboard, mouse, touchscreen, or other input devices), communication devices 1926 (such as modems, network interface devices, or other types of communication devices that may communicate through a computer network 1960), audio I/O devices 1924, and/or a storage unit 1928. A storage unit 1928 may store code and data 1930, which may be executed by processors 1970 and/or 1980. In alternative embodiments, any portions of the bus architectures could be implemented with one or more PtP links.

The computer system depicted in FIG. 19 is a schematic illustration of an embodiment of a computing system that may be utilized to implement various embodiments discussed herein. It will be appreciated that various components of the system depicted in FIG. 19 may be combined in a system-on-a-chip (SoC) architecture or in any other suitable configuration capable of achieving the functionality and features of examples and implementations provided herein.

While this disclosure has been described with respect to a limited number of embodiments, those skilled in the art will appreciate numerous modifications and variations therefrom. It is intended that the appended claims cover all such modifications and variations as fall within the true spirit and scope of this present disclosure.

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present disclosure.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices. Moreover, the term logic may also include software, firmware, or any combination of hardware, firmware, and/or software.

Use of the phrase "to" or "configured to," in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' or 'to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example, the decimal number ten may also be represented as a binary value of 1010 and a hexadecimal letter A. Therefore, a value includes any representation of information capable of being held in a computer system.

Embodiments may be described as a process depicted as a flowchart, a flow diagram, a data flow diagram, a structure diagram, or a block diagram. Although a flowchart may describe the operations as a sequential process, many of the operations may be performed in parallel, concurrently, or simultaneously. In addition, the order of the operations may be re-arranged. A process may be terminated when its operations are completed but may also have additional steps not included in the FIGS. A process may correspond to a method, a function, a procedure, a subroutine, a subprogram, and the like. When a process corresponds to a function, its termination may correspond to a return of the function to the calling function and/or the main function. Additionally, some or all of the operations in two or more separate flowcharts may be combined into one embodiment.

The present disclosure is described with reference to flowchart illustrations and/or block diagrams of methods (processes), apparatuses (systems) and/or computer program products according to embodiments of the disclosure. It will be understood that each block of the flowchart illustrations and/or block diagrams, and combinations of blocks in the flowchart illustrations and/or block diagrams, can be implemented by hardware, firmware, software, or a combination thereof. In one or more embodiments, each block of the flowchart illustrations and/or block diagrams, and combinations of blocks in the flowchart illustrations and/or block diagrams could be in the form of computer program instructions.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform embodiments of the disclosure may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

As used herein, the term "circuitry" refers to, is part of, or includes hardware components such as an electronic circuit, a logic circuit, a processor (shared, dedicated, or group) and/or memory (shared, dedicated, or group), an Application Specific Integrated Circuit (ASIC), a field-programmable device (FPD), (e.g., a field-programmable gate array (FPGA), a programmable logic device (PLD), a complex PLD (CPLD), a high-capacity PLD (HCPLD), a structured ASIC, or a programmable System on Chip (SoC)), digital signal processors (DSPs), etc., that are configured to provide the described functionality. In some embodiments, the circuitry may execute one or more software or firmware programs to provide at least some of the described functionality.

As used herein, the term "processor circuitry" may refer to, is part of, or includes circuitry capable of sequentially and automatically carrying out a sequence of arithmetic or logical operations; recording, storing, and/or transferring digital data. The term "processor circuitry" may refer to one or more application processors, one or more baseband processors, a physical central processing unit (CPU), a single-core processor, a dual-core processor, a triple-core processor, a quad-core processor, and/or any other device capable of executing or otherwise operating computer-executable instructions, such as program code, software modules, and/or functional processes. As used herein, the term "interface circuitry" may refer to, is part of, or includes circuitry providing for the exchange of information between two or more components or devices. The term "interface circuitry" may refer to one or more hardware interfaces (for example, buses, input/output (I/O) interfaces, peripheral component interfaces, network interface cards, and/or the like). As used herein, the terms "instantiate," "instantiation," and the like may refer to the creation of an instance, and an "instance" may refer to a concrete occurrence of an object, which may occur, for example, during execution of program code.

A computing system or a platform may use various devices coupled to a computer bus extensively. A computer bus may include related hardware components (wire, optical fiber, etc.) and software, including communication protocols. A peripheral component interconnect (PCI) bus or a PCI Express (PCIe, PCI-E) may be a computer bus based on a specification or interface standard that provides a mechanism for system software, or a system driver, to perform various operations related to the configuration of a device coupled to the PCI bus or the PCIe bus. Devices, or components coupled to a computer bus may also be referred to as functions. PCIe may operate in consumer, server, and industrial applications, as a motherboard-level interconnect (to link motherboard-mounted peripherals), a passive backplane interconnect, and as an expansion card interface for add-in boards. PCIe devices communicate via a logical connection called an interconnect or link. A link is a point-to-point communication channel between two PCIe ports allowing both of them to send and receive ordinary PCI requests, e.g., configuration, input/output (I/O), or memory read/write, and interrupts. At the physical level, a link may be composed of one or more lanes. Low-speed peripherals, such as an 802.11 Wi-Fi card, use a single-lane (×1) link, while a graphics adapter typically uses a much wider and faster 16-lane link. It should be noted that a "link" can also refer to communication channels associated with any other type of interface standards connecting high-speed components.

Reference throughout this specification to "one embodiment" or "an embodiment" means that a particular feature, structure, or characteristic described in connection with the embodiment is included in at least one embodiment of the present disclosure. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used herein, unless expressly stated to the contrary, use of the phrase 'at least one of' refers to any combination of the named items, elements, conditions, or activities. For example, 'at least one of X, Y, and Z' is intended to mean any of the following: 1) at least one X, but not Y and not Z; 2) at least one Y, but not X and not Z; 3) at least one Z, but not X and not Y; 4) at least one X and at least one Y, but not Z; 5) at least one X and at least one Z, but not Y; 6) at least one Y and at least one Z, but not X; or 7) at least one X, at least one Y, and at least one Z.

Additionally, unless expressly stated to the contrary, the terms 'first', 'second', 'third', etc., are intended to distinguish the particular nouns (e.g., element, condition, module, activity, operation, claim element, etc.) they modify, but are not intended to indicate any type of order, rank, importance, temporal sequence, or hierarchy of the modified noun. For example, 'first X' and 'second X' are intended to designate two separate X elements that are not necessarily limited by any order, rank, importance, temporal sequence, or hierarchy of the two elements.

In the foregoing specification, a detailed description has been given with reference to specific exemplary embodiments, but is not intended to be exhaustive or to limit the scope of embodiments to the precise form disclosed. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

OTHER NOTES AND EXAMPLES

The following examples pertain to embodiments in accordance with this specification. The system, apparatus, method, and machine readable storage medium embodiments can include one or a combination of the following examples.

Example A1 provides a device comprising a link including multiple lanes to connect the device to a receiving device, the multiple lanes including first lanes and second lanes; and circuitry coupled to the link. In Example A1, the circuitry is to: receive original data comprising first bits and second bits to be transmitted in a new clock cycle, where the first bits are to be transmitted via the first lanes, respectively, and the second bits are to be transmitted via the second lanes, respectively; determine whether a first criterion associated with the first bits is met; determine whether a second criterion associated with the second bits is met; and determine whether to transmit an inverted version of the original data via the multiple lanes based, at least in part, on determining whether the first criterion is met and whether the second criterion is met.

In Example A2, the subject matter of Example A1 can optionally include where determining that the first criterion is met is to include determining that a majority of the first lanes have respective previous bit values that are required to transition based on at least some of the first bits; and determining that the second criterion is met is to include determining that a majority of the second lanes have respective previous bit values that are required to transition based on at least some the second bits.

In Example A3, the subject matter of Example A2 can optionally include where the respective previous bit values of the first lanes are associated with a previous clock cycle, and where the respective previous bit values of the second lanes are associated with the previous clock cycle.

In Example A4, the subject matter of any one of Examples A2-A3 can optionally include where the circuitry is further to: prior to determining that the first criterion is met, determine that the respective previous bit values of the majority of the first lanes are different than respective first bit values of a corresponding majority of the first bits; and prior to determining that the second criterion is met, determine that the majority of the respective previous bit values of the second lanes are different than respective second bit values of a corresponding majority of the second bits.

In Example A5, the subject matter of any one of Examples A1-A4, can optionally include where the circuitry is further to, in response to determining that the first criterion and the second criterion have been met, encode the original data into the inverted version to be transmitted via the multiple lanes.

In Example A6, the subject matter of Example A1 can optionally include where determining that the first criterion is not met is to include determining that at least half of the first lanes have respective previous bit values that are not required to transition based at least half of the first bits, and where determining that the second criterion is not met is to include determining that at least half of the second lanes have respective previous bit values that are not required to transition based at least half of the second bits.

In Example A7, the subject matter of any one of Examples A1 or A6 can optionally include where the circuitry is further to, in response to determining that the first criterion and the second criterion have not been met, transmit the original data on the multiple lanes.

In Example A8, the subject matter of Example A1 can optionally include where the circuitry is further to determine that the first criterion is met based on determining that a majority of the first bits have a first value, and determine that the second criterion is met based on determining that a majority of the second bits have the first value.

In Example A9, the subject matter of Example A8 can optionally include where the first value is a binary 0 or 1.

In Example A10, the subject matter of any one of Examples A1-A9 can optionally include where the circuitry is further to determine whether a third criterion associated with third bits of the original data is met, and determine whether to transmit the inverted version of the original data via the multiple lanes based, in part, on determining whether the third criterion is met.

In Example A11, the subject matter of Example A10 can optionally include where determining that the third criterion is met is to include determining that a majority of third lanes of the multiple lanes have respective previous bit values that are required to transition based on at least some of third bits of the original data.

In Example A12, the subject matter of any one of Examples A1-A11 can optionally include where a number of the first lanes is equal to a number of the second lanes.

In Example A13, the subject matter of any one of Examples A1-A12 can optionally include where the link is a multi-chip package link, and where the first lanes and the second lanes are data lanes.

Example S1 provides a system comprising a processor, a first device coupled to the processor, and a plurality of lanes including first lanes and second lanes, the plurality of lanes to connect the first device to a second device. In Example S1, the first device is to: obtain original data comprising first bits and second bits to be transmitted in a new clock cycle, where the first bits are to be transmitted via the first lanes, respectively, and the second bits are to be transmitted via the second lanes, respectively; determine whether a first criterion associated with the first bits is met; determine whether a second criterion associated with the second bits is met; and transmit an inverted version of the original data via the plurality of lanes in response to, at least in part, determining that the first criterion is met and that the second criterion is met.

In Example S2, the subject matter of Example S1 can optionally include where determining that the first criterion is met is to include determining that a majority of the first lanes have respective previous bit values that are required to transition based on at least some of the first bits, and where determining that the second criterion is met is to include determining that a majority of the second lanes have respective previous bit values that are required to transition based on at least some the second bits.

In Example S3, the subject matter of Example S2 can optionally include where the respective previous bit values of the first lanes are associated with a previous clock cycle, and where the respective previous bit values of the second lanes are associated with the previous clock cycle.

In Example S4, the subject matter of any one of Examples S2-S3 can optionally include where the first device is further to: prior to determining that the first criterion is met, determine that the respective previous bit values of the majority of the first lanes are different than respective first bit values of a corresponding majority of the first bits; and prior to determining that the second criterion is met, determine that the majority of the respective previous bit values of the second lanes are different than respective second bit values of a corresponding majority of the second bits.

In Example S5, the subject matter of any one of Examples S1-S4, can optionally include where the first device is further to, in response to determining that the first criterion and the second criterion have been met, encode the original data into the inverted version to be transmitted via the multiple lanes.

In Example S6, the subject matter of Example S1 can optionally include where determining that the first criterion is not met is to include determining that at least half of the first lanes have respective previous bit values that are not required to transition based at least half of the first bits, and where determining that the second criterion is not met is to include determining that at least half of the second lanes have respective previous bit values that are not required to transition based at least half of the second bits.

In Example S7, the subject matter of any one of Examples S1 or S6 can optionally include where the first device is further to, in response to determining that the first criterion and the second criterion have not been met, transmit the original data on the multiple lanes.

In Example S8, the subject matter of Example S1 can optionally include where the first device is further to determine that the first criterion is met based on determining that a majority of the first bits have a first value, and determine that the second criterion is met based on determining that a majority of the second bits have the first value.

In Example S9, the subject matter of Example S8 can optionally include where the first value is a binary 0 or 1.

In Example 510, the subject matter of any one of Examples S1-59 can optionally include where the first device is further to determine whether a third criterion associated with third bits of the original data is met, and determine whether to transmit the inverted version of the original data via the multiple lanes based, in part, on determining whether the third criterion is met.

In Example S11, the subject matter of Example S10 can optionally include where determining that the third criterion is met is to include determining that a majority of third lanes of the multiple lanes have respective previous bit values that are required to transition based on at least some of third bits of the original data.

In Example S12, the subject matter of any one of Examples S1-S11 can optionally include where a number of the first lanes is equal to a number of the second lanes.

In Example S13, the subject matter of any one of Examples S1-S12 can optionally include the system further comprising a multi-chip package link connecting the first device to the second device, where the multi-chip package link includes the plurality of lanes, and where the first lanes and the second lanes are data lanes.

Example M1 provides a method comprising obtaining, at a first device connected by a plurality of lanes to a second device, original data comprising first bits and second bits, where the first bits are to be transmitted in a new clock cycle via first lanes of the plurality of lanes, respectively, and the second bits are to be transmitted in the new clock cycle via second lanes of the plurality of lanes, respectively. The method further comprises determining whether a first criterion associated with the first bits is met, determining whether a second criterion associated with the second bits is met, and determining whether to transmit an inverted version of the original data via the plurality of lanes based, at least in part, on determining whether the first criterion is met and whether the second criterion is met.

In Example M2, the subject matter of Example M1 can optionally include the method further comprising: determining that the first criterion is met, including determining that a majority of the first lanes have respective previous bit values that are required to transition based on at least some of the first bits; and determining that the second criterion is met, including determining that a majority of the second lanes have respective previous bit values that are required to transition based on at least some the second bits.

In Example M3, the subject matter of Example M2 can optionally include where the respective previous bit values of the first lanes are associated with a previous clock cycle, and where the respective previous bit values of the second lanes are associated with the previous clock cycle.

In Example M4, the subject matter of any one of Examples M2-M3 can optionally include the method further comprising: prior to determining that the first criterion is met, determining that the respective previous bit values of the majority of the first lanes are different than respective first bit values of a corresponding majority of the first bits; and prior to determining that the second criterion is met, determining that the majority of the respective previous bit values of the second lanes are different than respective second bit values of a corresponding majority of the second bits.

In Example M5, the subject matter of any one of Examples M1-M4, can optionally include the method further comprising, in response to determining that the first criterion and the second criterion have been met, encoding the original data into the inverted version to be transmitted via the multiple lanes.

In Example M6, the subject matter of Example M1 can optionally include where determining that the first criterion is not met includes determining that at least half of the first lanes have respective previous bit values that are not required to transition based at least half of the first bits, and where determining that the second criterion is not met includes determining that at least half of the second lanes have respective previous bit values that are not required to transition based at least half of the second bits.

In Example M7, the subject matter of any one of Examples M1 or M6 can optionally include the method further comprising, in response to determining that the first criterion and the second criterion have not been met, transmitting the original data on the multiple lanes.

In Example M8, the subject matter of Example M1 can optionally include the method further comprising determining that the first criterion is met based on determining that a majority of the first bits have a first value, and determining that the second criterion is met based on determining that a majority of the second bits have the first value.

In Example M9, the subject matter of Example M8 can optionally include where the first value is a binary 0 or 1.

In Example M10, the subject matter of any one of Examples M1-M9 can optionally include the method further comprising determining whether a third criterion associated with third bits of the original data is met, and determining whether to transmit the inverted version of the original data via the multiple lanes based, in part, on determining whether the third criterion is met.

In Example M11, the subject matter of Example M10 can optionally include where determining that the third criterion is met includes determining that a majority of third lanes of the multiple lanes have respective previous bit values that are required to transition based on at least some of third bits of the original data.

In Example M12, the subject matter of any one of Examples M1-M11 can optionally include where a number of the first lanes is equal to a number of the second lanes.

In Example M13, the subject matter of any one of Examples M1-M12 can optionally include the plurality of lanes is part of a multi-chip package link connecting the first device to the second device, and where the first lanes and the second lanes are data lanes.

Example C1 provides At least one non-transitory machine accessible storage medium having instructions stored thereon, the instructions when executed on a machine, cause the machine to: obtain, at a first device connected by a plurality of lanes to a second device, original data comprising first bits and second bits, where the first bits are to be transmitted in a new clock cycle via first lanes of the plurality of lanes, respectively, and the second bits are to be transmitted in the new clock cycle via second lanes of the plurality of lanes, respectively; determine whether a first criterion associated with the first bits is met; determine whether a second criterion associated with the second bits is met; and determine whether to transmit an inverted version of the original data via the plurality of lanes based, at least in part, on determining whether the first criterion is met and whether the second criterion is met.

In Example C2, the subject matter of Example C1 can optionally include where determining that the first criterion is met is to include determining that a majority of the first lanes have respective previous bit values that are required to transition based on at least some of the first bits; and determining that the second criterion is met is to include determining that a majority of the second lanes have respective previous bit values that are required to transition based on at least some the second bits.

In Example C3, the subject matter of Example C2 can optionally include where the respective previous bit values of the first lanes are associated with a previous clock cycle, and where the respective previous bit values of the second lanes are associated with the previous clock cycle.

In Example C4, the subject matter of any one of Examples C2-C3 can optionally include where the instructions, when executed on the machine, cause the machine further to: prior to determining that the first criterion is met, determine that the respective previous bit values of the majority of the first lanes are different than respective first bit values of a corresponding majority of the first bits; and prior to determining that the second criterion is met, determine that the majority of the respective previous bit values of the second lanes are different than respective second bit values of a corresponding majority of the second bits.

In Example C5, the subject matter of any one of Examples C1-C4, can optionally include where the instructions, when executed on the machine, cause the machine further to, in response to determining that the first criterion and the second criterion have been met, encode the original data into the inverted version to be transmitted via the multiple lanes.

In Example C6, the subject matter of Example C1 can optionally include where determining that the first criterion is not met is to include determining that at least half of the first lanes have respective previous bit values that are not required to transition based at least half of the first bits, and where determining that the second criterion is not met is to include determining that at least half of the second lanes have respective previous bit values that are not required to transition based at least half of the second bits.

In Example C7, the subject matter of any one of Examples C1 or C6 can optionally include where the instructions, when executed on the machine, cause the machine further to, in response to determining that the first criterion and the second criterion have not been met, transmit the original data on the multiple lanes.

In Example C8, the subject matter of Example C1 can optionally include where the instructions, when executed on the machine, cause the machine further to determine that the first criterion is met based on determining that a majority of the first bits have a first value, and determine that the second criterion is met based on determining that a majority of the second bits have the first value.

In Example C9, the subject matter of Example C8 can optionally include where the first value is a binary 0 or 1.

In Example C10, the subject matter of any one of Examples C1-C9 can optionally include where the instructions, when executed on the machine, cause the machine further to determine whether a third criterion associated with third bits of the original data is met, and determine whether to transmit the inverted version of the original data via the multiple lanes based, in part, on determining whether the third criterion is met.

In Example C11, the subject matter of Example C10 can optionally include where determining that the third criterion is met is to include determining that a majority of third lanes of the multiple lanes have respective previous bit values that are required to transition based on at least some of third bits of the original data.

In Example C12, the subject matter of any one of Examples C1-C11 can optionally include where a number of the first lanes is equal to a number of the second lanes.

In Example C13, the subject matter of any one of Examples C1-C12 can optionally include where the plurality of lanes is part of a multi-chip package link connecting the first device to the second device, and where the first lanes and the second lanes are data lanes.

An Example Y1 provides an apparatus, the apparatus comprising means for performing the method of any one of the preceding Examples M1-M13.

In Example Y2, the subject matter of Example Y1 can optionally include that the means for performing the method comprises at least one processor and at least one memory element.

In Example Y3, the subject matter of any one of Examples Y1-Y2 can optionally include that the apparatus is one of a computing system, a system-on-a-chip, or a multi-chip package device, or a die.

What is claimed is:

1. A device comprising:
   a link including multiple lanes to connect the device to a receiving device, the multiple lanes including first lanes and second lanes; and
   circuitry coupled to the link, the circuitry to:
      receive original data comprising first bits and second bits to be transmitted in a new clock cycle, wherein the first bits are to be transmitted via the first lanes, respectively, and the second bits are to be transmitted via the second lanes, respectively;
      make a first determination as to whether a first criterion associated with the first bits is met based on whether a first majority of the first lanes has respective first bit values that are required to transition in the new clock cycle;
      make a second determination as to whether a second criterion associated with the second bits is met based on whether a second majority of the second lanes has respective second bit values that are required to transition in the new clock cycle; and
      make a third determination as to whether to transmit an inverted version of the original data via the multiple lanes in the new clock cycle.

2. The device of claim 1, wherein:
   making the first determination that the first criterion is met is to be based on the first majority of the first lanes having the respective first bit values that are required to transition in the new clock cycle; and
   making the second determination that the second criterion is met is to be based on the second majority of the second lanes having the respective second bit values that are required to transition in the new clock cycle.

3. The device of claim 2, wherein the respective first bit values of the first lanes are associated with a first clock cycle occurring prior to the new clock cycle, and wherein the respective second bit values of the second lanes are associated with the first clock cycle.

4. The device of claim 2, wherein the circuitry is further to:
   determine that the respective first bit values of the first majority of the first lanes are different than a corresponding majority of the first bits; and
   determine that the respective second bit values of the second majority of the second lanes are different than a corresponding majority of the second bits.

5. The device of claim 1, wherein the circuitry is further to:
   in response to determining that the first criterion and the second criterion have been met, encode the original data into the inverted version to be transmitted via the multiple lanes.

6. The device of claim 1, wherein:
   making the first determination that the first criterion is not met is to be based on at least half of the first lanes having respective third bit values that are not required to transition in the new clock cycle, and
   making the second determination that the second criterion is not met is to be based on at least half of the second lanes having respective fourth bit values that are not required to transition in the new clock cycle.

7. The device of claim 1, wherein the circuitry is further to:
in response to making the first determination that the first criterion is not met and making the second determination that the second criterion is not met, transmit the original data on the multiple lanes.

8. The device of claim 1, wherein the circuitry is further to:
make a fourth determination as to whether a third criterion associated with third bits of the original data is met,
wherein making the third determination as to whether to transmit the inverted version of the original data in the new clock cycle via the multiple lanes is to be based, in part, on the fourth determination as to whether the third criterion is met.

9. The device of claim 8, wherein making the fourth determination that the third criterion is met is to be based on a third majority of third lanes of the multiple lanes having respective third bit values that are required to transition in the new clock cycle based on corresponding third bits of the original data.

10. The device of claim 1, wherein a number of the first lanes is equal to a number of the second lanes.

11. The device of claim 1, wherein the link is a multi-chip package link, and wherein the first lanes and the second lanes are data lanes.

12. A system, comprising:
a processor;
a first device coupled to the processor; and
a plurality of lanes including first lanes and second lanes, the plurality of lanes to connect the first device to a second device, wherein the first device is to:
obtain original data comprising first bits and second bits to be transmitted in a new clock cycle, wherein the first bits are to be transmitted via the first lanes, respectively, and the second bits are to be transmitted via the second lanes, respectively;
make a first determination that a first criterion associated with the first bits is met based on a first majority of the first lanes having respective first bit values that are required to transition in the new clock cycle;
make a second determination that a second criterion associated with the second bits is met based on a second majority of the second lanes having respective second bit values that are required to transition in the new clock cycle; and
transmit an inverted version of the original data via the plurality of lanes in the new clock cycle in response to, at least in part, making the first determination that the first criterion is met and making the second determination that the second criterion is met.

13. The system of claim 12, wherein:
making the first determination that the first criterion is met is to be based on the first majority of the first lanes having the respective first bit values that are required to transition in the new clock cycle; and
making the second determination that the second criterion is met is to be based on the second majority of the second lanes having the respective second bit values that are required to transition in the new clock cycle.

14. The system of claim 13, wherein the respective first bit values of the first lanes are associated with a first clock cycle occurring prior to the new clock cycle, and wherein the respective second bit values of the second lanes are associated with the first clock cycle.

15. A method comprising:
obtaining, at a first device connected by a plurality of lanes to a second device, original data comprising first bits and second bits, wherein the first bits are to be transmitted in a new clock cycle via first lanes of the plurality of lanes, respectively, and the second bits are to be transmitted in the new clock cycle via second lanes of the plurality of lanes, respectively;
making a first determination as to whether a first criterion associated with the first bits is met based on whether a first majority of the first lanes has respective first bit values that are required to transition in the new clock cycle;
making a second determination as to whether a second criterion associated with the second bits is met based on whether a second majority of the second lanes has respective second bit values that are required to transition in the new clock cycle; and
making a third determination as to whether to transmit an inverted version of the original data via the plurality of lanes in the new clock cycle based, at least in part, on the first determination and the second determination.

16. The method of claim 15, wherein:
making the first determination that the first criterion is met is based on the first majority of the first lanes having the respective first bit values that are required to transition in the new clock cycle; and
making the second determination that the second criterion is not met is based on at least half of the second lanes having respective third bit values that are not required to transition in the new clock cycle.

17. The method of claim 16, further comprising:
determining that the respective first bit values of the first majority of the first lanes are different than a corresponding majority of the first bits; and
determining that the respective third bit values of at least half of the second lanes are the same as a corresponding-at least half of the second bits.

18. The system of claim 12, wherein the first device is further to:
make a third determination that a third criterion associated with third bits of the original data is met, wherein the inverted version of the original data is to be transmitted via the plurality of lanes in the new clock cycle in response to, in part, making the third determination that the third criterion is met.

19. The system of claim 18, wherein making the third determination that the third criterion is met is based on a third majority of third lanes of the plurality of lanes having respective third bit values that are required to transition in the new clock cycle.

20. The system of claim 12, wherein the plurality of lanes is a multi-chip package link, and wherein the first lanes and the second lanes are data lanes.

* * * * *